(12) United States Patent
Zhang

(10) Patent No.: US 11,546,110 B2
(45) Date of Patent: *Jan. 3, 2023

(54) METHOD AND DEVICE FOR MULTI-ANTENNA TRANSMISSION IN USER EQUIPMENT (UE) AND BASE STATION

(71) Applicant: APEX BEAM TECHNOLOGIES LLC, Marshall, TX (US)

(72) Inventor: XiaoBo Zhang, Shanghai (CN)

(73) Assignee: APEX BEAM TECHNOLOGIES LLC, Marshall, TX (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/143,180

(22) Filed: Jan. 7, 2021

(65) Prior Publication Data

US 2021/0126751 A1 Apr. 29, 2021

Related U.S. Application Data

(63) Continuation of application No. 16/429,077, filed on Jun. 3, 2019, now Pat. No. 10,944,527, which is a
(Continued)

(30) Foreign Application Priority Data

Dec. 3, 2016 (CN) .......................... 201611098328.7

(51) Int. Cl.
*H04L 5/00* (2006.01)
*H04B 7/0413* (2017.01)
(Continued)

(52) U.S. Cl.
CPC ........... *H04L 5/005* (2013.01); *H04B 7/0408* (2013.01); *H04B 7/0413* (2013.01); *H04B 7/06* (2013.01);
(Continued)

(58) Field of Classification Search
CPC ..... H04L 5/005; H04L 1/0003; H04L 1/1819; H04L 5/0082; H04B 7/0408; H04B 7/0413; H04B 7/06; H04B 7/0617; H04W 88/02
See application file for complete search history.

(56) References Cited

U.S. PATENT DOCUMENTS 11,139,875 B2 * 10/2021 Wei ....................... H04B 7/0452
11,245,449 B2 * 2/2022 Frenne .................. H04L 5/0092
(Continued)

FOREIGN PATENT DOCUMENTS

CN 101447815 A 6/2009
CN 101567865 A 10/2009
(Continued)

OTHER PUBLICATIONS

TSG RAN WG1, "R1-1608690 Remaining issues on aperiodic CSI-RS," 3GPPOct. 1, 2016, 2016, pp. 1-5.
(Continued)

*Primary Examiner* — Deepa Belur
(74) *Attorney, Agent, or Firm* — Zhong Law, LLC

(57) ABSTRACT

The present disclosure discloses a method and device for multi-antenna transmission in UE and base station. The user equipment receives a first radio signal at first, then receives a first signaling. The first radio signal is transmitted by K antenna port groups, and the first signaling is used to determine a first time resource pool; a second antenna virtualization vector is associated with the first antenna port group; the second antenna virtualization vector is an antenna virtualization vector available to the user equipment in the first time resource pool. The invention effectively reduces signaling overhead of wireless resource dynamic scheduling of a massive MIMO system.

20 Claims, 15 Drawing Sheets

Related U.S. Application Data continuation of application No. PCT/CN2017/112033, filed on Nov. 21, 2017.

(51) Int. Cl.
  *H04B 7/06* (2006.01)
  *H04L 1/00* (2006.01)
  *H04L 1/18* (2006.01)
  *H04W 88/02* (2009.01)
  *H04B 7/0408* (2017.01)

(52) U.S. Cl.
  CPC ......... *H04B 7/0617* (2013.01); *H04L 1/0003* (2013.01); *H04L 1/1819* (2013.01); *H04L 5/0082* (2013.01); *H04W 88/02* (2013.01)

(56) References Cited

U.S. PATENT DOCUMENTS

| | | | |
|---|---|---|---|
| 2011/0223876 A1 | 9/2011 | Kang | |
| 2015/0010106 A1 | 1/2015 | Skov et al. | |
| 2015/0341100 A1* | 11/2015 | Kwak | H04L 5/0048 370/329 |
| 2016/0094326 A1 | 3/2016 | Moon et al. | |
| 2016/0157218 A1* | 6/2016 | Nam | H04B 7/0632 370/329 |
| 2017/0041113 A1* | 2/2017 | Park | H04L 5/0057 |
| 2017/0373743 A1* | 12/2017 | Park | H04L 25/0204 |
| 2019/0288807 A1* | 9/2019 | Zhang | H04L 1/0003 |

FOREIGN PATENT DOCUMENTS

| | | | |
|---|---|---|---|
| CN | 103687010 A | | 3/2014 |
| CN | 105207705 A | | 12/2015 |
| CN | 105577318 A | | 5/2016 |
| CN | 105656607 A | | 6/2016 |
| CN | 104853417 B | * | 8/2018 |
| CN | 104852756 B | * | 9/2018 |
| WO | 2016018100 A1 | | 2/2016 |
| WO | 2016077584 A1 | | 5/2016 |

OTHER PUBLICATIONS

Chinese Notice of Allowance dated Jan. 21, 2022 received in Chinese Application No. 2020103207574, pp. 3.
Nortel Discussion on RS Designfor Higher-order MIMOin LTE-A,Mar. 27, 2009 3GPPTSG-RAN Working Group 1 Meeting#56bis R1-091591.
LG Electronics RS designenhancements forsupporting EB and FD-MIMO,Oct. 10, 2014,3GPP TSG RAN WG1 Meeting #78bisR1-144047.
Ericsson Phasee2modeling of 2D AntennaArrays,Nov. 21, 2014,3GPP TSG-RAN WG1#79 R1-145169.
Texas InstrumentsRemaining Issues onULMIMO TransmissionMode and DCI FormatDesign,Jul. 2, 2010,3GGP TSG RAN WG161bis R1-103705.
ISR received in application No. PCT/CN2017/112033 dated Feb. 7, 2018.
First Office Action received from the No. 201611098328.7 dated Jan. 6, 2020.
First Search Report received from the No. 201611098328.7 dated Dec. 26, 2019.
Notice of Granting Patent Right for Invention received from the No. 201611098328.7 dated Apr. 21, 2020.

\* cited by examiner

METHOD AND DEVICE FOR MULTI-ANTENNA TRANSMISSION IN USER EQUIPMENT (UE) AND BASE STATION

CROSS-REFERENCE TO RELATED APPLICATION

This application is a continuation of the U.S. application Ser. No.16/429,077, filed on Jun. 3, 2019, which is a continuation of International Application No. PCT/CN2017/112033, filed on Nov. 21, 2017, claiming the priority benefit of Chinese Patent Application Serial Number 201611098328.7, filed on Dec. 3, 2016. The afore-mentioned patent applications are hereby incorporated by reference in their entireties.

BACKGROUND

Technical Field

The present disclosure relates to a multiple antenna transmission method in a wireless communication system.

Related Art

Massive Multiple-Input Multiple-Output (MIMO) has become a research hotspot for next-generation mobile communications. In massive MIMO, multiple antennas can improve communication quality by forming narrower beams pointing to a specific direction through beamforming.

According to the discussion of 3rd Generation Partner Project (3GPP) Radio Access Network (RAN), the hybrid beamforming combining analog beamforming and digital beamforming has become an important research direction of New Radio (NR) system.

SUMMARY

In a massive MIMO system, the total throughput of a cell can be greatly increased by the number of massive antennas, so the number of single-cell users can be greatly increased. However, an increase in the number of cell users will lead to a large amount of signaling overhead for dynamic scheduling of wireless time-frequency resources. The signaling overhead of wireless resource dynamic scheduling is an urgent problem to be solved in massive MIMO system.

In view of the above problem, the present disclosure provides a solution. It should be noted that, in the case of no conflict, the features in the embodiments and embodiments in the user equipment of the present disclosure can be applied to the base station, and vice versa. The features of the embodiments and the embodiments of the present disclosure may be combined with each other arbitrarily if no conflict is incurred.

The present disclosure discloses a method for multi-antenna transmission in a user equipment (UE), comprising:
receiving first radio signal; and
receiving a first signaling;
wherein the first radio signal is transmitted by K antenna port groups; the antenna port group(s) include a positive integer number of the antenna port(s); a first antenna port group is one of the K antenna port groups; the first signaling is used to determine a first time resource pool; at least one of a first antenna virtualization vector and a second antenna virtualization vector is associated with the first antenna port group; the firs antenna virtualization vector is an antenna virtualization vector available to a transmitter of the first signaling in the first time resource pool; the second antenna virtualization vector is an antenna virtualization vector available to the user equipment in the first time resource pool; the K is a positive integer greater than 1.

In one embodiment, the foregoing method is advantageous in that, by associating the first time resource pool with the first antenna port group, the UE can quickly determines the location of the first time resource pool in the time domain by the index of the first antenna port group in the K antenna port groups.

In one embodiment, the foregoing method is advantageous in that, by associating the first time resource pool with the first antenna port group, the UE can quickly determine the antenna virtualization vectors which used for receiving radio signal transmitted on the first time resource pool by the location of the first time resource pool in the time domain.

In one embodiment, the first radio signal is a multi-carrier symbol.

In one embodiment, the first radio signal is a single carrier symbol.

In one embodiment, the first radio signal is an OFDM symbol.

In one embodiment, the first radio signal is an FBMC symbol.

In one embodiment, the first radio signal is an SC-FDMA symbol.

In one embodiment, the first radio signal is reference signal(s) associated with the K antenna port groups.

In one embodiment, the first radio signal is wireless resource block(s) transmitted by the K antenna port groups.

In one embodiment, the first radio signal includes one or more of Primary Synchronization Signal (PSS), Secondary Synchronization Signal (SSS), Master Information Block (MIB)/System Information Block (SIB), and Channel State Information Reference signal(s) (CSI-RS).

In one embodiment, the antenna port is formed by superposing multiple physical antennas through antenna virtualization; the mapping coefficients from the multiple physical antennas to the antenna port(s) constitute an antenna virtualization vector for the antenna virtualization.

In one embodiment, the beamforming vectors corresponding to any two different antenna ports cannot be assumed to be the same.

In one embodiment, the small-scale characteristics of a wireless channel experienced by a signal transmitted by one antenna port and cannot be used to infer the small-scale characteristics of a wireless channel experienced by a signal transmitted by another antenna port.

In one embodiment, an antenna port is associated with a reference signal.

In one embodiment, an antenna port is used to transmit a reference signal associated therewith.

In one embodiment, the pattern of the time-frequency resource occupied by the reference signal(s) in one subframe reuses the pattern of the CSI-RS in one subframe.

In one embodiment, the reference signal is a CSI-RS.

In one embodiment, the sequence corresponding to the reference signal is a Zadoff-Chu sequence.

In one embodiment, the sequence corresponding to the reference signal is a pseudo-random sequence.

In an embodiment, the time domain resources occupied by the reference signal(s) is(are) associated with at least one of time domain resources occupied by the first signaling and time domain resources occupied by the first radio signal.

In one embodiment, the frequency domain resources occupied by the reference signal(s) is associated with at least one of a frequency domain resources occupied by the first signaling and frequency domain resources occupied by the first radio signal.

In one embodiment, the frequency domain resources occupied by the reference signal(s) are configurable.

In one embodiment, the K antenna port groups are associated with K reference signal group(s), respectively.

In one embodiment, the K antenna port groups are respectively used to transmit K reference signal(s) groups.

In one embodiment, the K antenna port groups are used to transmit K CSI-RS group(s).

In one embodiment, the K antenna port groups correspond to K reference signal resources, and the first antenna port group corresponds to one of the K reference signal resources.

In one embodiment, the K reference signal groups are respectively transmitted on K reference signal resources.

In one embodiment, one reference signal resource includes a plurality of Resource Elements (REs).

In one embodiment, the K reference signal resources are pairwise orthogonal in the time-frequency domain.

In one embodiment, the antenna port group includes only one antenna port.

In one embodiment, the antenna port group includes two antenna ports. In one embodiment, the air interface resource(s) occupied by one antenna port is different from the air interface resource(s) occupied by another antenna port.

In one embodiment, the air interface resource(s) occupied by one reference signal is different from the air interface resource(s) occupied by another reference signal.

In one embodiment, the air interface resource(s) includes (include) at least one of time domain resources, frequency domain resources, and code domain resources.

In one embodiment, the pattern of the reference signal(s) transmitted by at least two antenna ports in the K antenna port groups are the same in the time-frequency resource block(s).

In one embodiment, the time-frequency resource block(s) is a Physical Resource block Pair (PRBP).

In one embodiment, the time-frequency resource block(s) occupies W subcarriers on the frequency domain and occupies a wideband symbol in the time domain, wherein the W is a positive integer greater than 1. In a sub-embodiment of this sub-embodiment, the wideband symbol is one of an OFDM symbol, an SC-FDMA symbol, and an SCMA symbol.

In one embodiment, the first radio signal is transmitted by the K antenna port groups in a manner that the first radio signal carries the K reference signal groups, and the antenna virtualization vectors corresponding to the K reference signal groups are respectively used to map the K reference signal groups to a set of physical antennas to be transmitted.

In one embodiment, the time resources respectively corresponding to the K antenna port groups are orthogonal.

In one embodiment, the first signaling is a semi-static signaling.

In one embodiment, the first signaling is a high layer signaling.

In one embodiment, the first signaling includes one or more RRC Information Elements (IEs).

In one embodiment, the first signaling is a dynamic signaling.

In one embodiment, the first signaling is a physical layer signaling.

In one embodiment, the first signaling is carried by a downlink physical layer control channel (i.e. a downlink channel that can only be used to carry physical layer signaling).

In one embodiment, the downlink physical layer control channel is a Physical Downlink Control Channel (PDCCH).

In one embodiment, the downlink physical layer control channel is a short PDCCH (sPDCCH).

In one embodiment, the first signaling carries downlink control information (DCI).

In one embodiment, the first signaling carries fast downlink control information (fast DCI).

In one embodiment, the first signaling is cell-common.

In one embodiment, the first signaling is UE-specific.

In one embodiment, the first signaling is specific to a terminal group, the terminal group includes multiple terminals, and the UE is one of the terminals of the terminal group.

In one embodiment, the first signaling is transmitted on a broadcast channel (i.e., a downlink channel that can only be used to carry broadcast signals).

In one embodiment, the broadcast channel includes a Physical Broadcast Channel (PBCH).

In one embodiment, the first signaling is transmitted by the first antenna port group.

In one embodiment, the first antenna port group includes L antenna port(s), the first signaling includes L first sub-signals, the L first sub-signals carry the same bit block, and the L first sub-signals are respectively transmitted by the L antenna port(s). The bit block includes a positive integer number of bit(s), and the L is a positive integer.

In one embodiment, the index of the first antenna port group in the K antenna port groups is a non-negative integer smaller than the K.

In one embodiment, the index of the first antenna port group in the K antenna port groups is used to generate the first signaling.

In one embodiment, a receiving beamforming vector for the first antenna port group is used to determine a receiving beamforming vector for the first signaling.

In one embodiment, the first signaling indicates the first antenna port group from the K antenna port groups.

In one embodiment, the first signaling explicitly indicates the first time resource pool.

In one embodiment, the first signaling implicitly indicates the first time resource pool.

In one embodiment, the first time resource pool is discontinuous in the time domain.

In one embodiment, a transmitter of the first signaling generates the transmitting analog beam corresponding to the first antenna port group by adopting the first antenna virtualization vector.

In one embodiment, the first antenna port group is used to transmit a first reference signal(s) group, and the first antenna virtualization vector is used to transmit the first reference signal(s) group.

In one embodiment, the UE generates the receiving analog beam corresponding to the first antenna port group(s) by adopting the second antenna virtualization vector.

In one embodiment, the second antenna virtualization vector is used to receive the first reference signal group(s).

In one embodiment, the first antenna virtualization vector is associated with the first antenna port group In one embodiment, the second antenna virtualization vector is associated with the first antenna port group.

In one embodiment, the first antenna virtualization vector and the second antenna virtualization vector are both associated with the first antenna port group.

In one embodiment, the third radio signal is a radio signal transmitted in a time resource within the first time resource pool. The first antenna virtualization vector is used by a transmitter of the first signaling to transmit an analog beamforming of the third radio signal.

In one embodiment, the third radio signal is a radio signal transmitted in a time resource within the first time resource pool. The second antenna virtualization vector is used by the UE to receive an analog beamforming of the third radio signal.

In one embodiment, the third radio signal is a radio signal transmitted in a time resource within the first time resource pool. The first antenna virtualization vector is used by a transmitter of the first signaling to receive an analog beamforming of the third radio signal.

In one embodiment, the third radio signal is a radio signal transmitted in a time resource within the first time resource pool. The second antenna virtualization vector is used by the U E to transmit an analog beamforming of the third radio signal.

In one embodiment, the first antenna port group includes L antenna port(s), the first antenna port is one of the L antenna port(s), and the first antenna virtualization vector is associated with the first antenna port.

In one embodiment, the second antenna virtualization vector is associated with the first antenna port.

According to one aspect of the present disclosure, the method comprises:

receiving a second signaling; and operating a second radio signal in a first time resource sub-pool;

wherein the operating is receiving; or the operating is transmitting; the second signaling is used to determine the first time resource sub-pool from the first time resource pool; the second signaling is used to determine at least one of occupied frequency domain resources, an MCS, a HARQ process number, an RV, an NDI, (a) transmitting antenna port(s) of the second radio signal.

In one embodiment, the advantages of the above method is that by the method of receiving the second signal to determine the first time resource sub-pool from the first time resource pool, the UE can significantly reduce the signaling overhead for determining the frequency domain resources occupied by the second radio signal.

In one embodiment, the second signaling is dynamic signaling.

In one embodiment, the second signaling is physical layer signaling.

In one embodiment, the second signaling is carried by a downlink physical layer control channel.

In one embodiment, the second signaling is a physical layer downlink control indication.

In one embodiment, the second signaling consists of two physical layer downlink control indications.

In one embodiment, the second signaling is for the UE.

In one embodiment, the second signaling is transmitted by the first antenna port group.

In one embodiment, the first antenna virtualization vector is used to transmit the second signaling.

In one embodiment, the first time resource sub-pool is discontinuous in the time domain.

In one embodiment, the time resource included in the first time resource sub-pool is a subset of the first time resource pool.

In one embodiment, the first time resource pool includes N1 time resources, and the first time resource sub-pool includes N2 time resources in the N1 time resources.

In one embodiment, the time resource is a sub-frame.

In one embodiment, the time resource is an OFDM symbol.

In one embodiment, the time resource is an SC-FDMA symbol.

In one embodiment, the time resource is an FBMC symbol.

In one embodiment, the UE determines the time resource included in the first time resource sub-pool by the joint indication of the second signaling and the first signaling.

In an embodiment, the second signaling is used to determine a relative position of the time resource comprised in the first time resource sub-pool in the first time resource pool.

In one embodiment, the second signaling indicates that the time resource comprised in the first time resource sub-pool corresponds to a bitmap of the first time resource pool.

In an embodiment, the second signaling indicates an index of a time resource comprised in the first time resource sub-pool in the first time resource pool.

In one embodiment, the second radio signal is a radio resource block(s).

In one embodiment, the time domain resources occupied by the second radio signal are the first time resource sub-pool, and the frequency domain resources occupied by the second radio signal are indicated by the second signaling.

In one embodiment, the second signaling is divided into M fields, and the first field and the second field are respectively two fields in the M fields. The first field is used to determine the first time resource sub-pool from the first time resource pool, and the second field is used to determine frequency domain resources occupied by the second radio signal.

In one embodiment, the second signaling is divided into M fields, and the first field is one of the M fields. The first field is configured to determine the first time resource sub-pool from the first time resource pool and is used to determine frequency domain resources occupied by the second radio signal.

In one embodiment, the transmitting channel corresponding to the second radio signal is a DL-SCH, and the operation is receiving.

In one embodiment, the physical layer channel corresponding to the second radio signal is a PDSCH, and the operation is receiving.

In one embodiment, the transmitting channel corresponding to the second radio signal is a UL-SCH, and the operation is transmitting.

In one embodiment, the physical layer channel corresponding to the second radio signal is a PUSCH, and the operation is transmitting.

In one embodiment, the operation is receiving, and the first antenna virtualization vector is used to transmit an analog beamforming of the second radio signal.

In one embodiment, the operation is receiving, and the second antenna virtualization vector is used to receive an analog beamforming of the second radio signal.

In one embodiment, the operation is transmitting, and the first antenna virtualization vector is used to receive an analog beamforming of the second radio signal.

In one embodiment, the operation is transmitting, and the second antenna virtualization vector is used to transmit an analog beamforming of the second radio signal.

In one embodiment, the second signaling explicitly indicates at least one of occupied frequency domain resources, an MCS, a HARQ process number, an RV, an NDI, (a) transmitting antenna port(s).

In one embodiment, the second signaling implicitly indicates at least one of occupied frequency domain resources, an MCS, a HARQ process number, an RV, an NDI, (a) transmitting antenna port(s).

In one embodiment, the first antenna port group is used to transmit first reference signal group, and the second radio signal and the first reference signal group are spatially Quasi Co-Located (QCL).

In one embodiment, the first antenna virtualization vector is used to transmit the second radio signal.

In one embodiment, the second antenna virtualization vector is used to receive the second radio signal.

According to another embodiment of the present disclosure, the method comprises:

receiving first information;

wherein the first information is used to determine the first antenna port group.

In one embodiment, the first information is used to determine the first antenna port group from the K antenna port groups.

In one embodiment, the first information explicitly indicates the first antenna port group.

In one embodiment, the first information implicitly indicates the first antenna port group.

In one embodiment, the first signaling includes the first information.

In one embodiment, a field in the first signaling indicates an index of the first antenna port group in the K antenna port groups.

In one embodiment, the first information is transmitted before the first signaling.

In one embodiment, the first information is used to determine a time resource pool in which the first signaling is located.

In one embodiment, the first information is used to determine a search space in which the first signaling is located.

According to another embodiment of the present disclosure, the method comprises:

transmitting second information;

wherein the second information is used to determine K1 antenna port group(s); the K1 antenna port group(s) belong to the K antenna port groups; the first antenna port group is one of the K1 antenna port group(s); the K1 is a positive integer.

In one embodiment, the second information is used to determine the first antenna port group from the K antenna port groups.

In one embodiment, the second information explicitly indicates the K1 antenna port group(s).

In one embodiment, the second information implicitly indicates the K1 antenna port group(s).

In an embodiment, the second information is time domain information corresponding to the K1 antenna port group(s).

In one embodiment, the second information includes a CSI-RS Resource Indicator (CRI) ( ), and the CRI indicates the CSI-RS resources corresponding to the K1 antenna port group(s) from the CSI-RS resources corresponding to the K antenna port groups.

In one embodiment, the physical layer channel corresponding to the second information includes an uplink physical layer control channel (i.e., an uplink channel that can only be used to carry physical layer signaling). In a sub-embodiment, the uplink physical layer control channel is a Physical Uplink Control Channel (PUCCH).

In one embodiment, the second information is a RACH preamble, and at least one of the sequences of the RACH preamble, and the time-frequency resource occupied by the RACH preamble is used to determine the first antenna port group.

In one embodiment, the physical layer channel corresponding to the second information includes a PRACH (Physical Random Access Channel).

In one embodiment, the K1 is equal to one.

In one embodiment, the K1 is greater than 1.

According to one aspect of the present disclosure, the method comprises:

monitoring the second signaling in a second time resource pool;

wherein the second signaling occupies at most one time resource block in the second time resource pool; the second time resource pool includes a positive integer number of the time resource block(s).

In one embodiment, the second time resource pool is discontinuous in the time domain.

In one embodiment, the time resource block is discontinuous in the time domain.

In one embodiment, the time resource block is continuous in the time domain.

In an embodiment, the second time resource pool is a UE-specific time resource pool.

In an embodiment, the second time resource pool is a specific time resource pool of the first antenna port group.

In one embodiment, the first antenna port group is used to determine the second time resource pool.

In one embodiment, the first antenna virtualization vector is used for transmitting analog beamforming of the second signaling.

In one embodiment, the second antenna virtualization vector is used for receiving analog beamforming of the second signaling.

In one embodiment, the second signaling is on the UE-specific search space.

In one embodiment, the second signaling is dynamic.

In one embodiment, the second signaling is carried by a downlink physical layer control channel.

In one embodiment, the downlink physical layer control channel is a PDCCH.

In one embodiment, the downlink physical layer control channel is an sPDCCH.

In one embodiment, the second signaling carries a DCI.

In one embodiment, the second signaling carries a fast DCI.

In one embodiment, the UE performs blind detection in the second time resource pool to determine a time-frequency resource occupied by the second signaling.

In one embodiment, the UE determines whether the second signaling is transmitted in the second time resource pool by using a blind detection method.

In one embodiment, the blind detection refers to that the UE receives a signal on multiple candidate time-frequency resources and performs a decoding operation, and if the decoding is determined correct according to the check bit, the receiving is judged as successful, otherwise the receiving is judged as a failure.

In one embodiment, the frequency resource pool corresponding to the blind detection is configurable.

According to another embodiment of the present disclosure, the method comprises:

monitoring the first signaling in a third time resource pool;

wherein the first signaling is a dynamic signaling; the first signaling occupies one time resource block in the third time resource pool at most; the third time resource pool includes a positive integer number of the time resource block(s); a minimum time interval between time resource blocks in the third time resource pool is greater than a minimum time interval between time resource blocks in the second time resource pool.

In one embodiment, the advantages of the foregoing method are that reducing the signaling overhead of notifying the UE to perform the time resource of the operation, and increasing the dynamicity of the time resource scheduling.

In one embodiment, the third time resource pool is discontinuous in the time domain.

In one embodiment, the time resource block is discontinuous in the time domain.

In one embodiment, the time resource block is continuous in the time domain.

In one embodiment, the third time resource pool is a time resource pool common to the cell.

In one embodiment, the third time resource pool is a UE-specific time resource pool.

In one embodiment, the third time resource pool is a specific time resource pool of the first antenna port group.

In one embodiment, the first antenna port group is used to determine the third time resource pool.

In one embodiment, the first antenna virtualization vector is used for transmitting analog beamforming of the first signaling.

In one embodiment, the second antenna virtualization vector is used for receiving analog beamforming of the first signaling.

In one embodiment, the UE performs blind detection in the third time resource pool to determine a time-frequency resource occupied by the first signaling.

In one embodiment, the UE determines whether the first signaling is transmitted in the third time resource pool by using a blind detection method.

In one embodiment, the first signaling is on a common search space.

In one embodiment, the first signaling is in a specific search space of the first antenna port group.

In one embodiment, the first signaling is on the UE-specific search space.

In one embodiment, the third time resource pool is a subset of the second time resource pool.

The present disclosure discloses a method for multi-antenna transmission in a base station, comprising:
transmitting first radio signal; and
transmitting a first signaling;
wherein the first radio signal is transmitted by K antenna port groups; the antenna port group(s) includes a positive integer number of the antenna port(s); the first antenna port group is one of the K antenna port groups; the first signaling is used to determine a first time resource pool; at least one first antenna virtualization vector, and second antenna virtualization vector is associated with the first antenna port group; the firs antenna virtualization vector is an antenna virtualization vector available to a transmitter of the first signaling in the first time resource pool; the second antenna virtualization vector is an antenna virtualization vector available to the user equipment in the first time resource pool; the K is a positive integer greater than 1.

In one embodiment, the first signaling is transmitted by the first antenna port group.

In one embodiment, the reference signal(s) transmitted by the first antenna port group with at least two different antenna port(s) has the same pattern in the time-frequency resource block(s).

In one embodiment, the first time resource pool is discontinuous in the time domain.

According to one aspect of the present disclosure, the method comprises:
transmitting a second signaling;
performing second radio signal in a first time resource sub-pool;
wherein the performing is transmitting; or the performing is receiving; the second signaling is used to determine the first time resource sub-pool from the first time resource pool; the second signaling is used to determine at least one of occupied frequency domain resources, an MCS, a HARQ process number, an RV, an NDI, (a) transmitting antenna port(s) of the second radio signal.

In one embodiment, the second signaling is transmitted by the first antenna port group.

In one embodiment, the second signaling is transmitted by one antenna port in the first antenna port group.

In one embodiment, the first time resource sub-pool is discontinuous in the time domain.

According to one aspect of the present disclosure, the method comprises:
transmitting first information;
wherein the first information is used to determine the first antenna port group.

In one embodiment, the first information is a domain of the first signaling.

In one embodiment, the first information is transmitted before the first signaling According to one aspect of the present disclosure, the method comprises:
receiving second information;
wherein the second information is used to determine K1 antenna port group(s); the K1 antenna port group(s) belong to the K antenna port groups; the first antenna port group is one of the K1 antenna port group(s); the K1 is a positive integer.

In one embodiment, the K1 is equal to 1.

In one embodiment, the K1 is greater than 1.

In one embodiment, the second information is a CRI.

According to another embodiment of the present disclosure, the method comprises:
transmitting the second signaling in a second time resource pool;
wherein the second signaling occupies one time resource block in the second time resource pool at most; the second time resource pool includes a positive integer number of the time resource block(s).

In one embodiment, the second time resource pool is discontinuous in the time domain.

According to one aspect of the present disclosure, the method comprises:
transmitting the first signaling in a third time resource pool;
wherein the first signaling is a dynamic signaling; the first signaling occupies one time resource block in the third time resource pool at most; the third time resource pool includes a positive integer number of the time resource block(s); a minimum time interval between time resource blocks in the third time resource pool is greater than a minimum time interval between time resource blocks in the second time resource pool.

In one embodiment, the third time resource pool discontinuous in the time domain.

The present disclosure discloses a user equipment for multi-antenna transmission, comprising:

a first transceiver, receiving first radio signal; and a second receiver, receiving a first signaling;

wherein the first radio signal is transmitted by K antenna port groups; the antenna port group(s) includes a positive integer number of the antenna port(s); the first antenna port group is one of the K antenna port groups; the first signaling is used to determine a first time resource pool; at least one first antenna virtualization vector, and second antenna virtualization vector is associated with the first antenna port group; the first antenna virtualization vector is an antenna virtualization vector available to a transmitter of the first signaling in the first time resource pool; the second antenna virtualization vector is an antenna virtualization vector available to the user equipment in the first time resource pool; the K is a positive integer greater than 1.

According to one aspect of the present disclosure, the method comprises:

a third receiver, receiving a second signaling; and a second transceiver, operating a second radio signal in a first time resource sub-pool;

wherein the operating is receiving; or the operating is transmitting; the second signaling is used to determine the first time resource sub-pool from the first time resource pool; and the second signaling is used to determine at least one of occupied frequency domain resources, an MCS, a HARQ process number, an RV, an NDI, (a) transmitting antenna port(s) of the second radio signal.

In one embodiment, the second receiver receives the first information. The first information is used to determine the first antenna port group.

In one embodiment, the first transceiver transmits the second information, wherein the second information is used to determine K1 antenna port group(s); the K1 antenna port group(s) belong to the K antenna port groups; the first antenna port group is one of the K1 antenna port group(s); the K1 is a positive integer.

In one embodiment, the third receiver further monitors the second signaling in a second time resource pool, wherein the second signaling occupies one time resource block in the second time resource pool at most; the second time resource pool includes a positive integer number of the time resource block(s).

In one embodiment, the first signaling is a dynamic signaling, and the second receiver monitors the first signaling in a third time resource pool. Wherein the first signaling occupies one time resource block in the third time resource pool at most; the third time resource pool includes a positive integer number of the time resource block(s); a minimum time interval between time resource blocks in the third time resource pool is greater than a minimum time interval between time resource blocks in the second time resource pool.

In one embodiment, the first time resource pool is discontinuous in the time domain.

In one embodiment, the first signaling is a semi-static signaling.

The present disclosure discloses a base station device for multi-antenna transmission, comprising:

a third transceiver, transmitting first radio signal;

a second transmitter, transmitting a first signaling;

wherein the first radio signal is transmitted by K antenna port groups; the antenna port group(s) includes a positive integer number of the antenna port(s); the first antenna port group is one of the K antenna port groups; the first signaling is used to determine a first time resource pool; at least one first antenna virtualization vector, and second antenna virtualization vector is associated with the first antenna port group; the firs antenna virtualization vector is an antenna virtualization vector available to a transmitter of the first signaling in the first time resource pool; the second antenna virtualization vector is an antenna virtualization vector available to a target receiver of the first signaling in the first time resource pool; the K is a positive integer greater than 1.

According to one aspect of the present disclosure, the method comprises:

third transmitter, transmitting a second signaling; and a fourth transceiver, performing a second radio signal in a first time resource sub-pool;

wherein the performing is transmitting; or the performing is receiving; the second signaling is used to determine the first time resource sub-pool from the first time resource pool; the second signaling is used to determine at least one of occupied frequency domain resources, an MCS, a HARQ process number, an RV, an NDI, (a) transmitting antenna port(s) of the second radio signal.

In one embodiment, the second transmitter transmits a first information. The first information is used to determine the first antenna port group.

In one embodiment, the third transceiver receives second information, wherein the second information is used to determine K1 antenna port group(s); the K1 antenna port group(s) belong to the K antenna port groups; the first antenna port group is one of the K1 antenna port group(s); the K1 is a positive integer.

In one embodiment, the third transmitter transmits the second signaling in a second time resource pool, wherein the second signaling occupies one time resource block in the second time resource pool at most; the second time resource pool includes a positive integer number of the time resource block(s).

In one embodiment, the first signaling is a dynamic signaling, and the second transmitter transmits the first signaling in a third time resource pool. Wherein the first signaling occupies one time resource block in the third time resource pool at most; the third time resource pool includes a positive integer number of the time resource block(s); a minimum time interval between time resource blocks in the third time resource pool is greater than a minimum time interval between time resource blocks in the second time resource pool.

In one embodiment, the first time resource pool is discontinuous in the time domain.

In one embodiment, the first signaling is a semi-static signaling.

Compared with traditional schemes, the present disclosure has the following advantages:

The overhead of wireless resource scheduling signaling is reduced by using beam information.

The joint indication of the time resources by the first signaling and the second signaling not only saves the signaling overhead, but also ensures the dynamic and timeliness of the signaling.

The gain of multiple antennas is utilized by using the first antenna virtualization vector and the second antenna virtualization vector.

The RF costs for multi-antenna systems is reduced by applying the first antenna virtualization vector and the second antenna virtualization vector to analog beamforming.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

Embodiment 1

Figure 1:
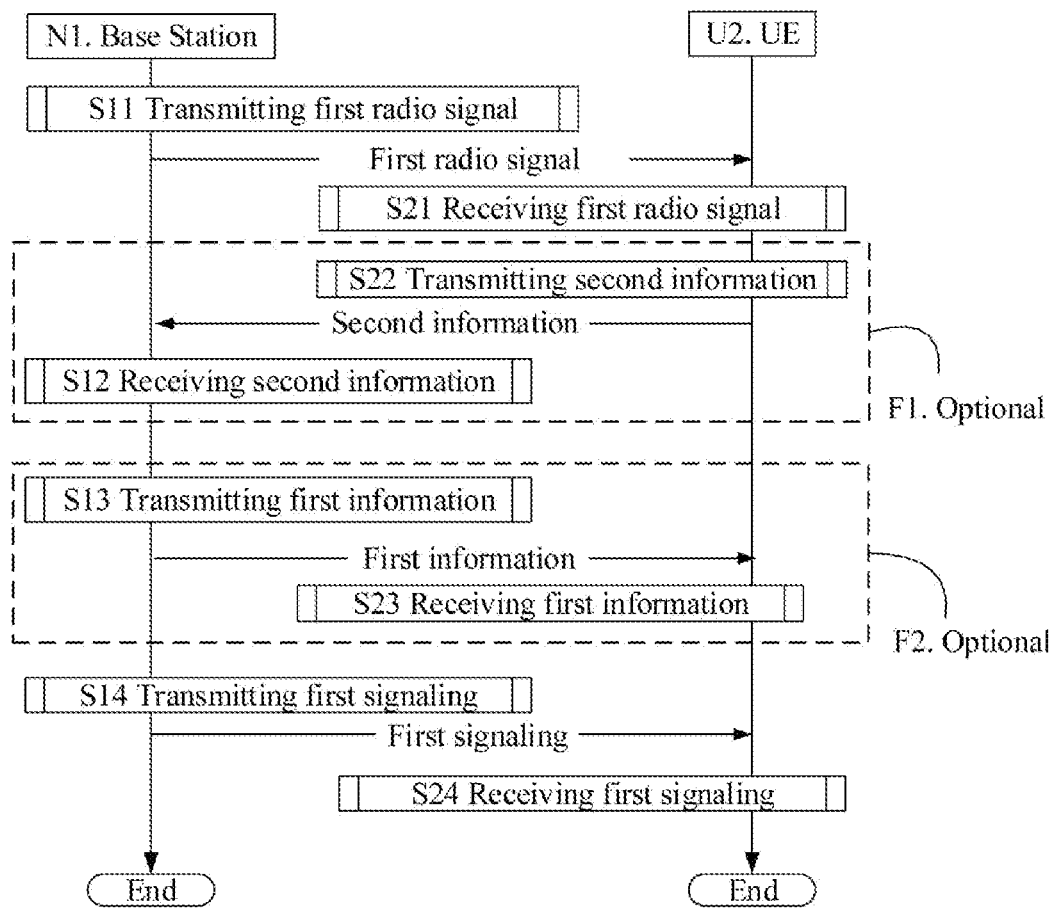
FIG. 1 shows a flowchart of wireless transmission according to one embodiment of the present disclosure.

Embodiment 1 illustrates a flow chart of wireless transmission according to one embodiment of the present disclosure, as shown in FIG. 1. In FIG. 1, the base station N1 is a maintenance base station of the serving cell of the UE U2. In the figure, the step in the box identified as F1 and F2 are optional, respectively.

The base station N1 transmits the first radio signal in step S11; receives the second information in step S12; transmits the first information in step S13; and transmits the first signaling in step S14.

The UE U2 receives the first radio signal in step S21; transmits the second information in step S22; receives the first information in step S23; and receives the first signaling in step S24.

In Embodiment 1, the first radio signal is transmitted by K antenna port groups, the antenna port group(s) includes a positive integer number of the antenna port(s); a first antenna port group is one of the K antenna port groups; the first signaling is used to determine a first time resource pool; at least one first antenna virtualization vector, and second antenna virtualization vector is associated with the first antenna port group; the first antenna virtualization vector is an antenna virtualization vector available to a transmitter of the first signaling in the first time resource pool; the second antenna virtualization vector is an antenna virtualization vector available to the user equipment in the first time resource pool; the K is a positive integer greater than 1. The first information is used to determine the first antenna port group. The second information is used to determine K1 antenna port group(s), the K1 antenna port group(s) belong to the K antenna port groups. The first antenna port group is one of the K1 antenna port group(s). The K1 is a positive integer.

In n a sub-embodiment 1 of Embodiment 1, the first antenna virtualization vector and the second antenna virtualization vector are both associated with the first antenna port group.

In a sub-embodiment 2 of embodiment 1, the second information includes a CRI.

In a sub-embodiment 3 of Embodiment 1, the first information is carried by RRC signaling.

In a sub-embodiment 4 of Embodiment 1, the first information is DCI.

In a sub-embodiment 5 of Embodiment 1, the K antenna port groups respectively correspond to K reference signal group(s).

In a sub-embodiment 6 of Embodiment 1, the first radio signal includes the K reference signal groups.

Embodiment 2

Figure 2:
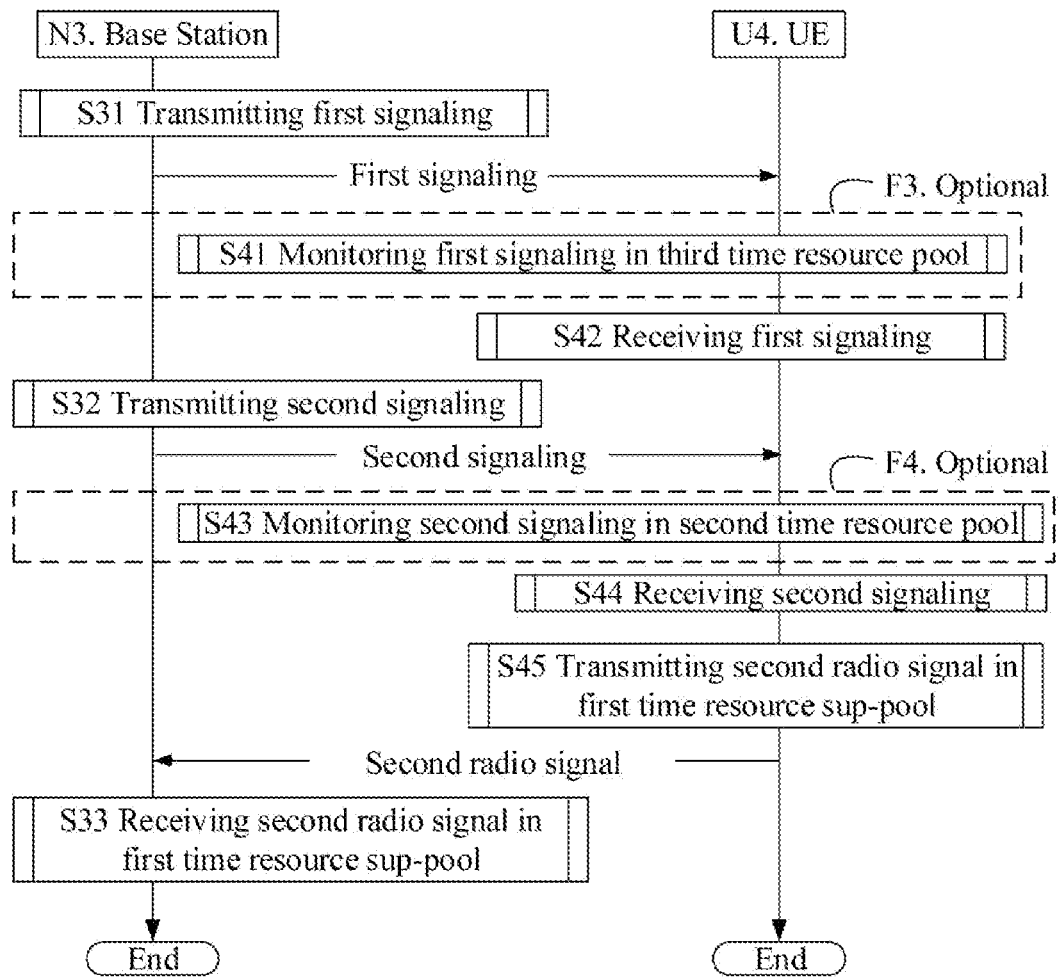
FIG. 2 shows a flowchart of wireless transmission according to another one embodiment of the present disclosure.

Embodiment 2 illustrates a flowchart of wireless transmission according to another one embodiment of the present disclosure, as shown in FIG. 2. In FIG. 2, the base station N3 is a maintenance base station of the serving cell of the user equipment U4. In Embodiment II, the N3 can reuse steps S11-S13 in FIG. 1 before step 31; the U4 can reuse steps S21-S23 in FIG. 1 before step S41. In FIG. 2, the step in the box identified as F3 and F 4 are optional, respectively.

The base station N3 transmits a first signaling in step S31; transmits a second signaling in step S32; receives second radio signal in the first time resource sub-pool in step S33.

The UE U4 monitors a first signaling in the third time resource pool in step S41; receives the first signaling in step S42; monitors a second signaling in the second time resource pool in step S43; receives the second signaling in step S44; transmits the second radio signal in the first time resource sub-pool in step S45.

In a sub-embodiment 1 of Embodiment 2, the first signaling is a semi-static RRC signaling, including one or more RRC IEs (Information Element).

In a sub-embodiment 2 of Embodiment 2, the first signaling is a DCI carried by a PDCCH.

In a sub-embodiment 3 of Embodiment 2, the first signaling is for a terminal group, the terminal group includes a plurality of terminals, and the UE is one terminal in the terminal group.

In a sub-embodiment 4 of Embodiment 2, the first signaling is transmitted by the first antenna port group.

n a sub-embodiment 5 of Embodiment 2, the second signaling is a DCI carried by a PDCCH. The second signaling is for a terminal group, the terminal group includes a plurality of terminals, and the UE is one terminal in the terminal group. The second signaling is transmitted by the first antenna port group.

In a sub-embodiment 6 of Embodiment 2, the transmission period of the first signaling is greater than the transmission period of the second signaling.

Embodiment 3

Figure 3:
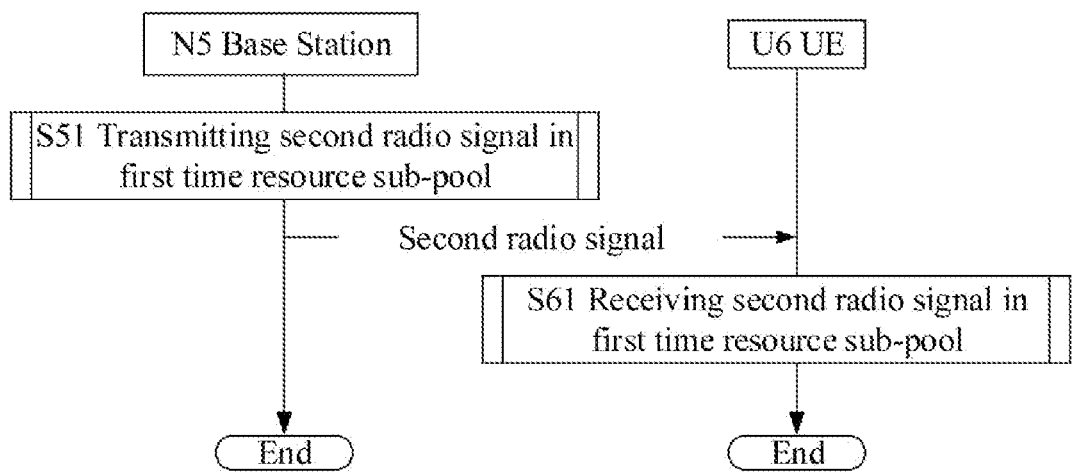
FIG. 3 shows a flowchart of wireless transmission in accordance with yet another embodiment of the present disclosure.

Embodiment 3 illustrates a flowchart of wireless transmission in accordance with yet another embodiment of the present disclosure, as shown in FIG. 3. In FIG. 3, a base station N5 is a maintenance base station for a serving cell of the UE U6. In Embodiment 3, the N5 can reuse steps S11-S13 in FIG. 1 and steps S31-S32 in FIG. 2 prior to step 51; the U4 can reuse steps S21-S23 in FIG. 1 and steps S41-S44 before in FIG. 2 prior to step S61.

The base station N5 transmits the second radio signal in the first time resource sub-pool in step S51.

The UE U6 receives the second radio signal in the first time resource sup-pool in step S61.

Embodiment 4

Figure 4:
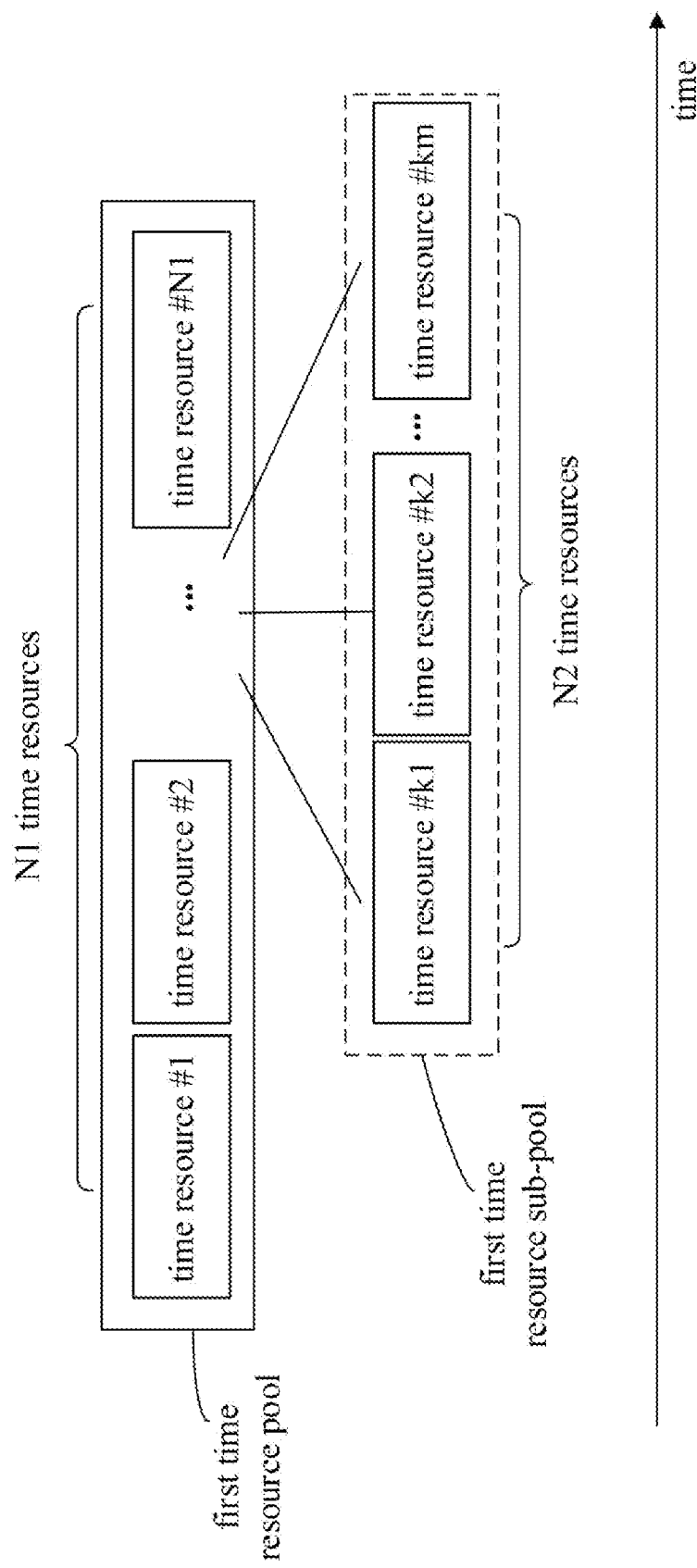
FIG. 4 shows a schematic diagram of a first time resource pool and a first time resource sub-pool according to one embodiment of the present disclosure.

Embodiment 4 illustrates a schematic diagram of a first time resource pool and a first time resource sub-pool, as shown in FIG. 4.

In Embodiment 4, the first time resource pool includes N1 time resources; the first signaling indicates the distribution of the first time resource pool in the time domain. The second radio signal is transmitted on the first time resource sub-pool. The first time resource sub-pool includes N2 time resources #k1-#km in the N1 time resources. The second signaling indicates the number #k1-#km of the N2 time resources in the N1 time resources.

In a sub-embodiment 1 of Embodiment 4, the time resource is a subframe.

In a sub-embodiment 2 of Embodiment 4, the time resource is an OFDM symbol.

Embodiment5

Figure 5:
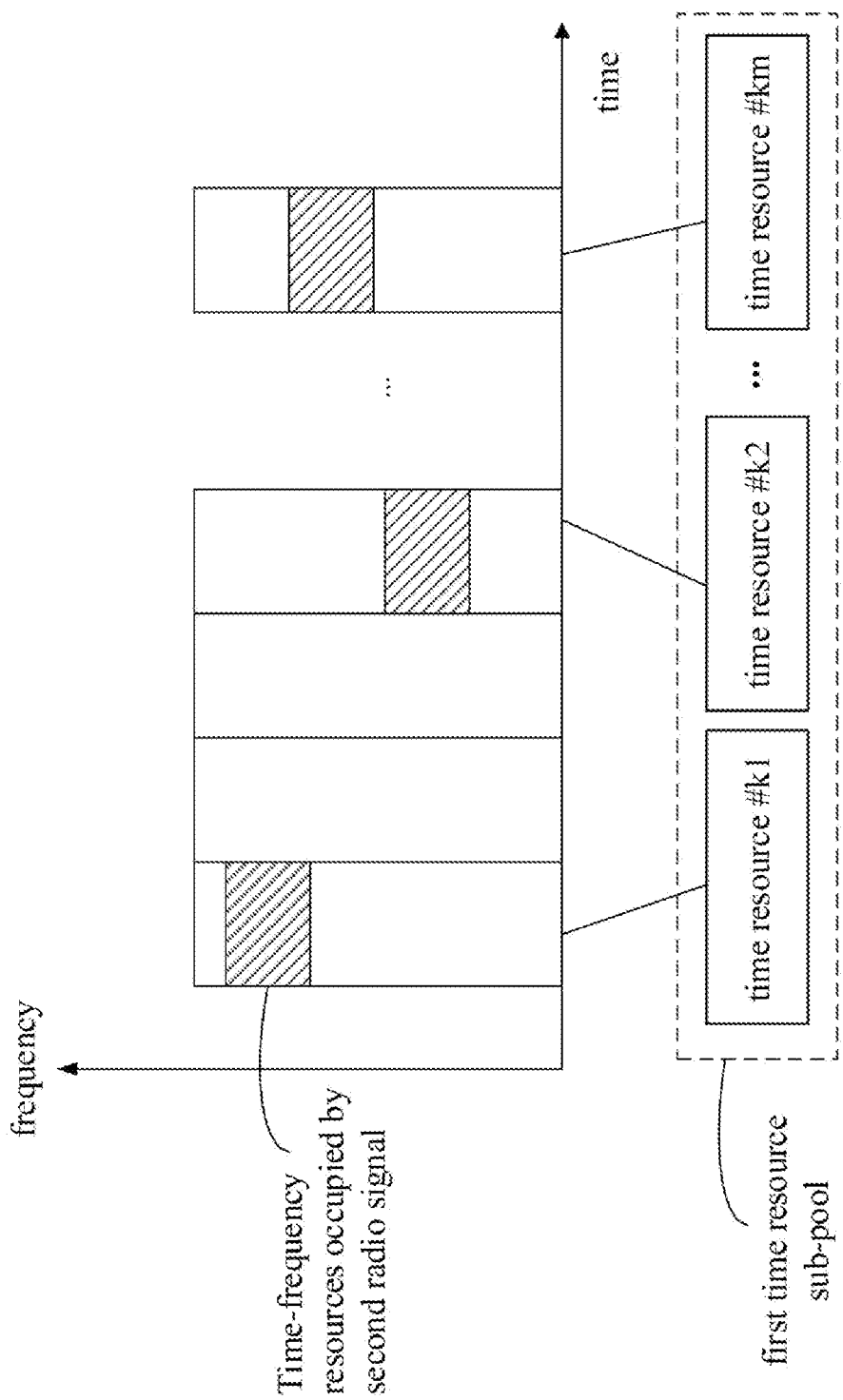
FIG. 5 shows a schematic diagram of a time-frequency resources occupied by a second radio signal according to one embodiment of the present disclosure.

Embodiment 5 illustrates a schematic diagram of a time-frequency resources occupied by second radio signal, as shown in FIG. 5. In FIG. 5, the slash-filled block is the time-frequency resource occupied by the second radio signal.

In Embodiment 5, the second radio signal is transmitted on the time resource #k1-#km of the first time resource sub-pool. By the second signaling, the UE determines a first time resource sub-pool from the first time resource pool and determines the frequency domain resources occupied by the second radio signal, thereby determining the second time-frequency resource occupied by the second radio signal.

In a sub-embodiment 1 of Embodiment 5, the time resource is a subframe.

In a sub-embodiment 2 of embodiment 5, the time resource is an OFDM symbol.

In a sub-embodiment 3 of the embodiment 5, the time-frequency resource is a wireless resource block(s).

Embodiment 6

Figure 6:
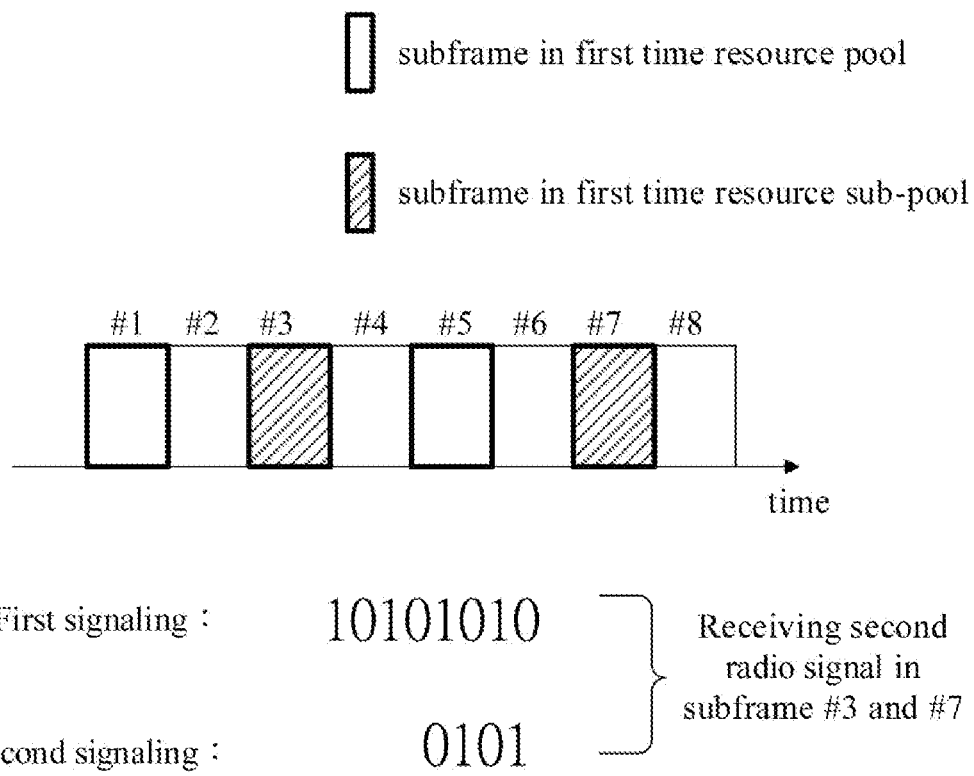
FIG. 6 shows a schematic diagram of the first time resource sub-pool jointly determined by the first signaling and the second signaling according to one embodiment of the present disclosure.

Embodiment 6 illustrates a schematic diagram of the first time resource sub-pool jointly determined by the first signaling and the second signaling, as shown in FIG. 6. In FIG. 6, the bold block is a subframe in the first time resource pool, and the slash-filled bold block is a subframe in the first time resource sub-pool.

In Embodiment 6, subframes #1-#8 are candidate subframes for transmitting a second radio signal, and the first signaling, by the form of bitmap, uses 10101010 to indicate that the first time resource pool is consisted of subframes # 1, # 3, # 5 and # 7, the second signaling, by the form of bitmap, uses 0101 to indicate that the subframe # 3 and # 7 in the first time resource pool {#1, #3, #5, #7} consists of the first time sub-pool , which means the UE receives the second radio signal on the subframes #3 and #7.

In a sub-embodiment 1 of Embodiment 6, the first signaling is high layer signaling, and the second signaling is UE-specific DCI.

In a sub-embodiment 2 of Embodiment 6, the first signaling is a terminal group specific DCI, and the second signaling is UE-specific DCI.

Embodiment 7

Figure 7:
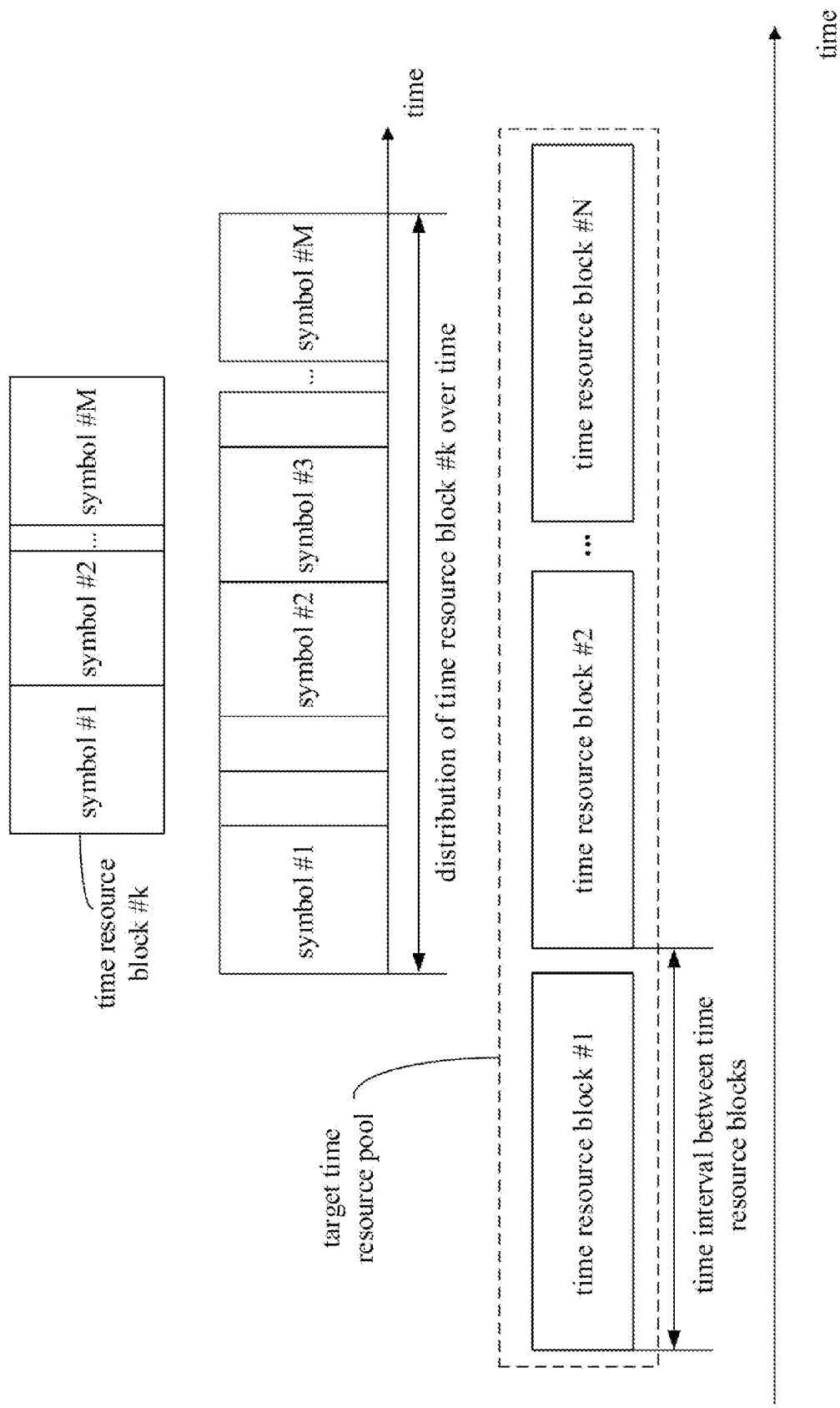
FIG. 7 shows a schematic diagram of a time resource pool and a time resource block according to one embodiment of the present disclosure.

Embodiment 7 illustrates a schematic diagram of a time resource pool and a time resource block, as shown in FIG. 7.

In Embodiment 7, one target time resource pool includes N time resource block(s), and the N time resource block(s) are discontinuous in the time domain. The time resource block #k is one of the N time resource block(s). The time resource block(s) #k includes M symbols in the target time resource pool. The M symbols in the target time resource pool are discontinuous in the time domain. The time interval between two time resource blocks is the time interval between the first symbols of the respective two time resource blocks.

In a sub-embodiment 1 of Embodiment 7, the target time resource pool is a second time resource pool, and the second signaling occupies one time resource block in the second time resource pool at most.

In a sub-embodiment 2 of Embodiment 7, the target time resource pool is a third time resource pool, and the first signaling occupies one time resource block in the third time resource pool at most.

In a sub-embodiment 3 of embodiment 7, the symbol is an OFDM symbol.

Embodiment 8

Figure 8:
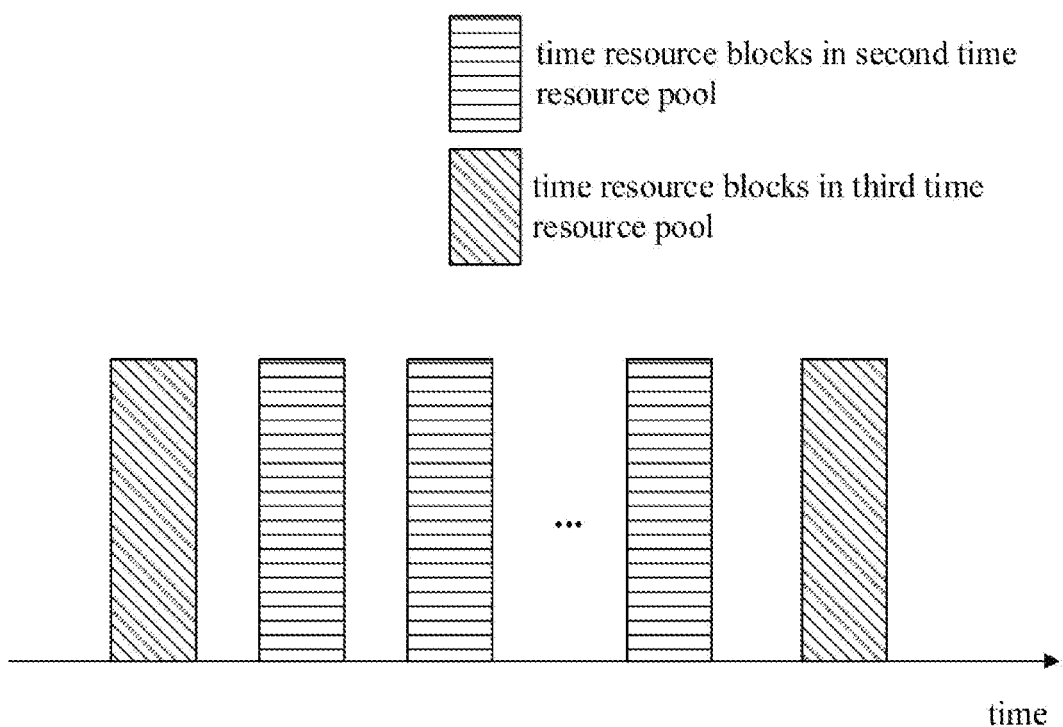
FIG. 8 shows a schematic diagram of the distribution of a second time resource pool and a third time resource pool in a time domain according to one embodiment of the present disclosure.

Embodiment 8 illustrates a schematic diagram of the distribution of the second time resource pool and the third time resource in the time domain, as shown in FIG. 8. In FIG. 8, the horizontally filled blocks are time resource blocks in the second time resource pool, and the diagonally filled blocks are time resource blocks in the third time resource pool.

In Embodiment 8, the second signaling is transmitted on one time resource block in the second time resource pool, and the first signaling is transmitted on one time resource block in the third time resource pool. Between two time resource blocks of the third time resource pool may exist a plurality of time resource blocks of the second time resource pool.

In a sub-embodiment 1 in Embodiment 8, the second time resource pool and the third time resource pool are discontinuous in the time domain.

Embodiment 9

Figure 9:
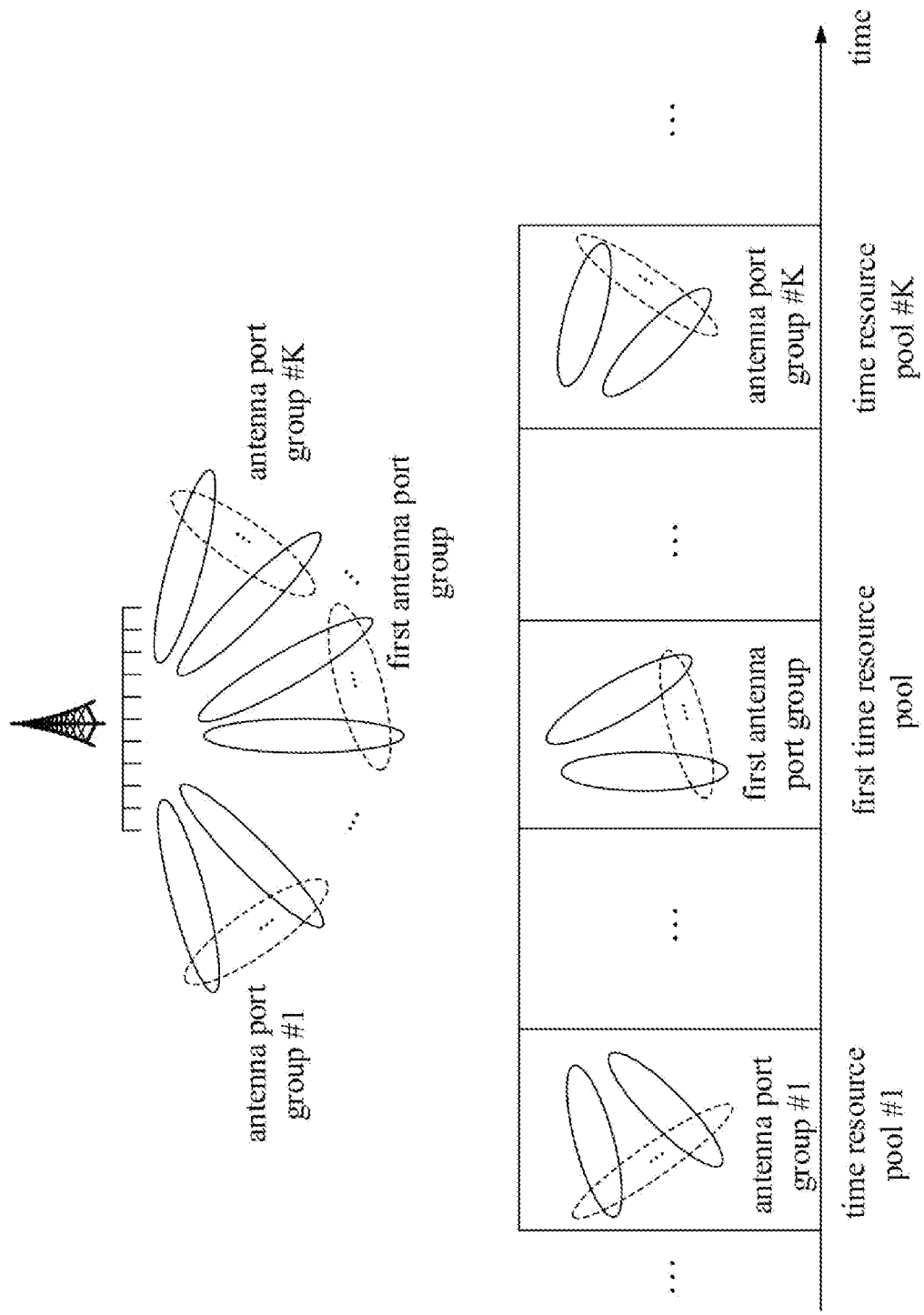
FIG. 9 shows schematic diagram of an antenna port group(s) corresponding to a time resource pool according to one embodiment of the present disclosure.

Embodiment 9 illustrates a schematic diagram of an antenna port group(s) corresponding to a time resource pool; as shown in FIG. 9.

In Embodiment 9, the first antenna port group is one of the K antenna port groups. The K antenna port groups respectively correspond to K different beam groups. The K antenna port groups respectively correspond to K time resource pools, and the first time resource pool is a time resource pool corresponding to the first antenna port group.

Embodiment 10

Figure 10:
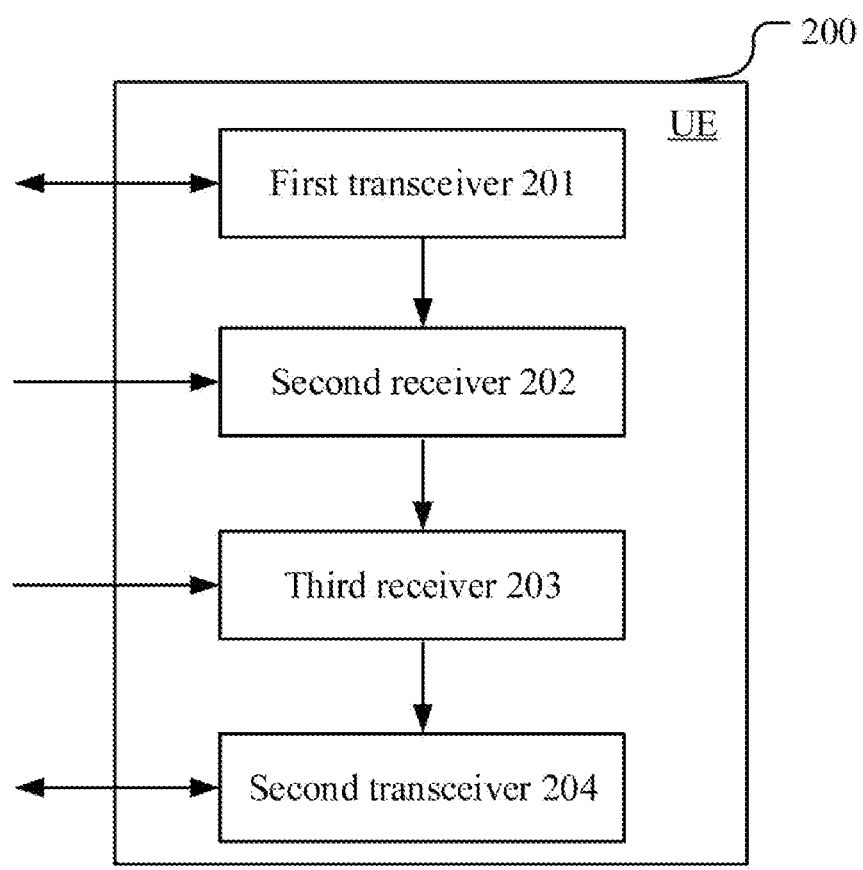
FIG. 10 shows a structural block diagram of a processing device for a UE according to one embodiment of the present disclosure.

Embodiment 10 illustrates a structural block diagram of a processing device in a UE, as shown in FIG. 10.

In FIG. 10, the UE 1000 is mainly composed of a first transceiver 1001, a second receiver 1002, a third receiver 1003, and a second transceiver 1004.

The first transceiver 1001 receives the first radio signal; the second receiver 1002 receives the first signaling; the third receiver 1003 receives the second signaling; and the second transceiver 1004 operates the second radio signal in the first time resource pool.

In the embodiment 10, the first radio signal is transmitted by K antenna port groups, and the antenna port group(s) includes a positive integer number of the antenna port(s). The K is a positive integer greater than 1. The first antenna port group is one of the K antenna port groups. The first signaling is used by the UE to determine the first time the resource pool. At least one of a first antenna virtualization vector and a second antenna virtualization vector is associated with the first antenna port group. The first antenna virtualization vector is an available antenna virtualization vector of the base station in the first time resource pool. The second antenna virtualization vector is an available antenna virtualization vector of the UE in the first time resource pool. The operation is receiving; or the operation is transmitting. The second signaling is used by the UE to determine the first time resource sub-pool from the first time resource pool, and the second signaling is further used by the UE to determine at least one of the occupied frequency domain resources, an MCS, a HARQ process number, an RV, an NDI, (a) transmit antenna port of the second radio signal.

In a sub-embodiment 1 of the embodiment 10, the second receiver 1002 is further used by the UE to receive the first information. The first information is used to determine the first antenna port group.

In a sub-embodiment 2 of the embodiment 10, the first transceiver 1001 is further used by the UE to transmit the second information. The second information is used by the base station to determine K1 antenna port group(s), the K1 antenna port group(s) belong to the K antenna port groups, and the first antenna port group is one of the K1 antenna port group(s). The K1 is a positive integer.

In a sub-embodiment 3 of embodiment 10, the third receiver 1003 is further used by the UE to monitor the second signaling in a second time resource pool.

In a sub-embodiment 4 of embodiment 10, the first signaling is a dynamic signaling, and the second receiver 1002 is further used by the UE to monitor the first signaling in a third time resource pool. The minimum time interval between time resource blocks in the third time resource pool is greater than the minimum time interval between time resource blocks in the second time resource pool.

In a sub-embodiment 5 of embodiment 10, the first time resource pool is discontinuous in the time domain.

In a sub-embodiment 6 of embodiment 10, the first signaling is a semi-static signaling.

In one embodiment, the second transceiver 1001 includes a transmitter/receiver 460, a MIMO detector 472, a receiving processor 452, an antenna 460, a controller/processor 490, and a memory 480 in Embodiment 15.

In one embodiment, the first transceiver 1001 includes a transmitting processor 455, a MIMO transmitting processor 471, a transmitter/receiver 460, and an antenna 460 in Embodiment 15.

In one embodiment, the second receiver 1002 includes a transmitter/receiver 460, a MIMO detector 472, a receiving processor 452, and an antenna 460 in Embodiment XV.

In one embodiment, the second receiver 1002 includes the controller/processor 490 in Embodiment 15.

In one embodiment, the third receiver 1003 includes the transmitter/receiver 460, the MIMO detector 472, the receiving processor 452, and the antenna 460 in Embodiment 15.

In one embodiment, the second transceiver 1004 includes the transmitter/receiver 460, the MIMO detector 472, the receiving processor 452, the antenna 460, the controller/processor 490, and the memory 480 in Embodiment 15.

In one embodiment, the second transceiver 1004 includes a transmitting processor 455, a MIMO transmitting processor 471, a transmitter/receiver 460, a controller/processor 490, a data source 467, and an antenna 460 in Embodiment 15.

Embodiment 11

Figure 11:
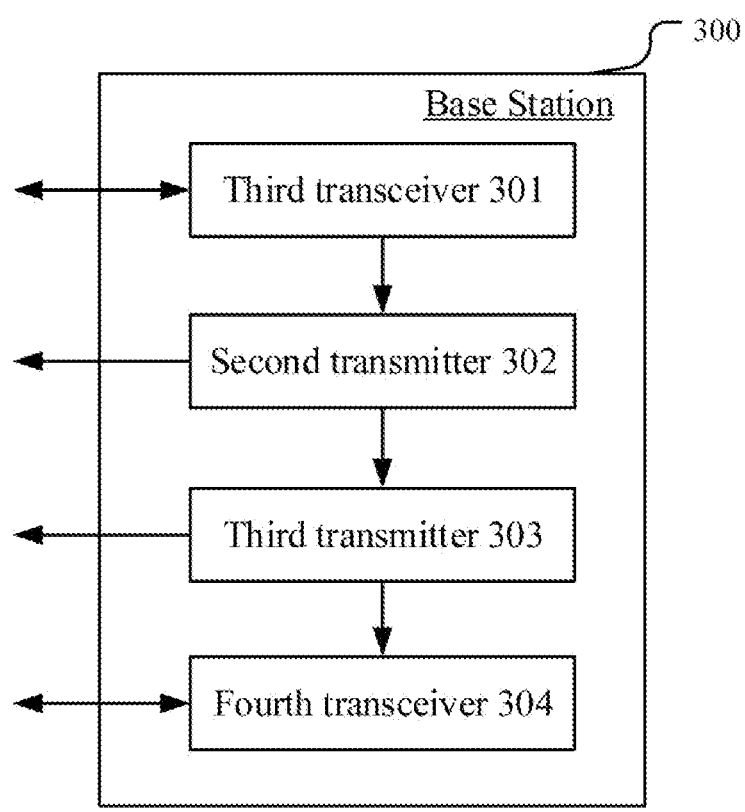
FIG. 11 shows a structural block diagram of a processing device for a base station according to one embodiment of the present disclosure.

Embodiment 11 illustrates a structural block diagram of a processing device in the base station equipment; as shown in FIG. 11.

FIG. 11, the base station 1100 is mainly composed of a third transceiver 1101, a second transmitter 1102, a third transmitter 1103, and a fourth transceiver 1104.

The third transceiver 1101 transmits first radio signal; the second transmitter 1102 transmits a first signaling; the third transmitter 1103 transmits a second signaling; and the fourth transceiver 1104 performs second radio signal in a first time resource sub-pool.

In Embodiment 11, the first radio signal is transmitted by K antenna port groups, and the antenna port group(s) includes a positive integer number of the antenna port(s). The K is a positive integer greater than 1. The first antenna port group is one of the K antenna port groups. The first signaling is used by the UE to determine the first time the resource pool. At least one first antenna virtualization vector, and the second antenna virtualization vector is associated with the first antenna port group. The first antenna virtualization vector is an available antenna virtualization vector of the base station in the first time resource pool. The second antenna virtualization vector is an available antenna virtualization vector of a target receiver of the first signaling in the first time resource pool. The K is a positive integer greater than 1. The performing is receiving; or the performing is transmitting. The second signaling is used by the UE to determine the first time resource sub-pool from the first time resource pool, and the second signaling is further used by the UE to determine at least one of the occupied frequency domain resources, a MCS, a HARQ process number, a RV, a NDI, (a) transmit antenna port of the second radio signal.

In a sub-embodiment 1 of Embodiment 11, the second transmitter 1102 is further used by the base station to transmit first information. Herein, the first information is used by the UE to determine the first antenna port group.

In a sub-embodiment 2 of the embodiment 11, the third transceiver 1101 is further used by the base station to receive the second information. Herein, the second information is used by the base station to determine K1 antenna port group(s), the K1 antenna port group(s) belong to the K antenna port groups, and the first antenna port group is one of the K1 antenna port group(s). The K1 is a positive integer.

In a sub-embodiment 3 of Embodiment 11, the third transmitter 1103 is further used by the base station to transmit the second signaling in a second time resource pool.

In a sub-embodiment 4 of Embodiment 11, the first signaling is a dynamic signaling, and the second transmitter 1102 is further used by the base station to transmit the first signaling in a third time resource pool. The minimum time interval between time resource blocks in the third time resource pool is greater than the minimum time interval between time resource blocks in the second time resource pool.

In a sub-embodiment 5 of embodiment 11, the first time resource pool is discontinuous in the time domain.

In a sub-embodiment 6 of Embodiment 11, the first signaling is a semi-static signaling.

In one embodiment, the third transceiver 1101 includes a transmitting processor 415, a MIMO transmitting processor 441, a transmitter/receiver 416, and an antenna 420 in Embodiment 15.

In one embodiment, the third transceiver 1101 includes an antenna 420, a transmitter/receiver 416, a MIMO detector 442, and a receiving processor 412 in Embodiment 15.

In one embodiment, the second transmitter 1102 includes a transmitting processor 415, a MIMO transmitting processor 441, a transmitter/receiver 416, and an antenna 420 in Embodiment 15.

In one embodiment, the second transmitter 1102 includes the controller/processor 440 of Embodiment 15.

In one embodiment, the third transmitter 1103 includes a transmitting processor 415, a MIMO transmitting processor 441, a transmitter/receiver 416, and an antenna 420 in Embodiment 15.

In one embodiment, the fourth transceiver 1104 includes the controller/processor 440, the transmitting processor 415, the MIMO transmitting processor 441, the transmitter/receiver 416, and the antenna 420 in Embodiment 15.

In one embodiment, the fourth transceiver 1104 includes an antenna 420, a transmitter/receiver 416, a MIMO detector 442, a receiving processor 412, a controller/processor 440, and a memory 430 in Embodiment 15.

Embodiment 12

Figure 12:
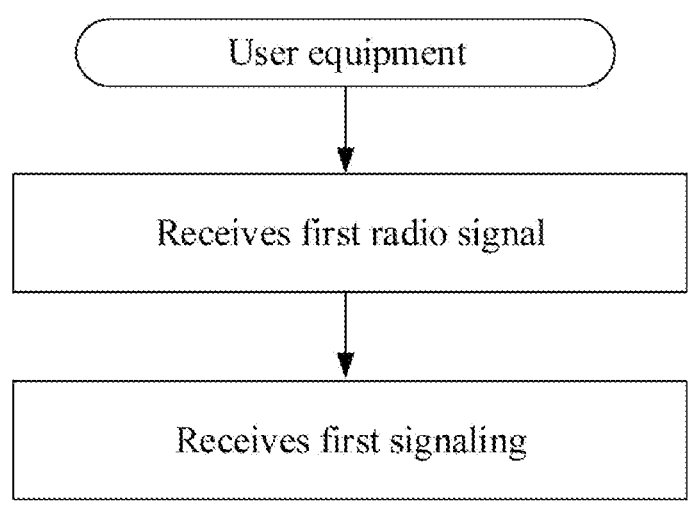
FIG. 12 shows flow chart of a first radio signal and first signaling according to one embodiment of the present disclosure.

Embodiment 12 illustrates a flow chart of the first radio signal and the first signaling, as shown in FIG. 12. In FIG. 12, each box represents a step. In Embodiment 12, the user equipment (UE) in the present disclosure sequentially receives a first radio signal and a first signaling; wherein the first radio signal is transmitted by the K antenna port groups; the antenna port group(s) includes a positive integer number of the antenna port(s); the first antenna port group is one of the K antenna port groups; the first signaling is used to determine a first time resource pool. At least one first antenna virtualization vector, and the second antenna virtualization vector is associated with the first antenna port group. The first antenna virtualization vector is an antenna virtualization vector available to a transmitter of the first signaling in the first time resource pool; the second antenna virtualization vector is an antenna virtualization vector available to a target receiver of the first signaling in the first time resource pool; the K is a positive integer greater than 1.

In one embodiment, the first radio signal is K reference signal(s) groups respectively transmitted by the K antenna port groups. The first reference signal group(s) is(are) reference signal group(s) transmitted by the first antenna port group in the K reference signal group(s). The first antenna virtualization vector is used to form an analog transmitting beam for transmitting the first reference signal group, and the second antenna virtualization vector is used to form an analog receiving beam for receiving the first reference signal group(s).

In one embodiment, the first signaling is a semi-static signaling.

In one embodiment, the first time resource pool is used to transmit physical layer control signaling.

In one embodiment, the first signaling is a dynamic signaling.

In one embodiment, the first time resource pool is used to transmit high layer signaling or data.

In one embodiment, the first antenna virtualization vector is used to form a wireless channel corresponding to the first antenna port group.

In one embodiment, the second antenna virtualization vector is used to form a wireless channel corresponding to the first antenna port group.

In one embodiment, the second antenna virtualization vector is a spatial Receive(Rx) parameter used by the UE to receive a radio signal in the first time resource pool.

Embodiment 13

Figure 13:
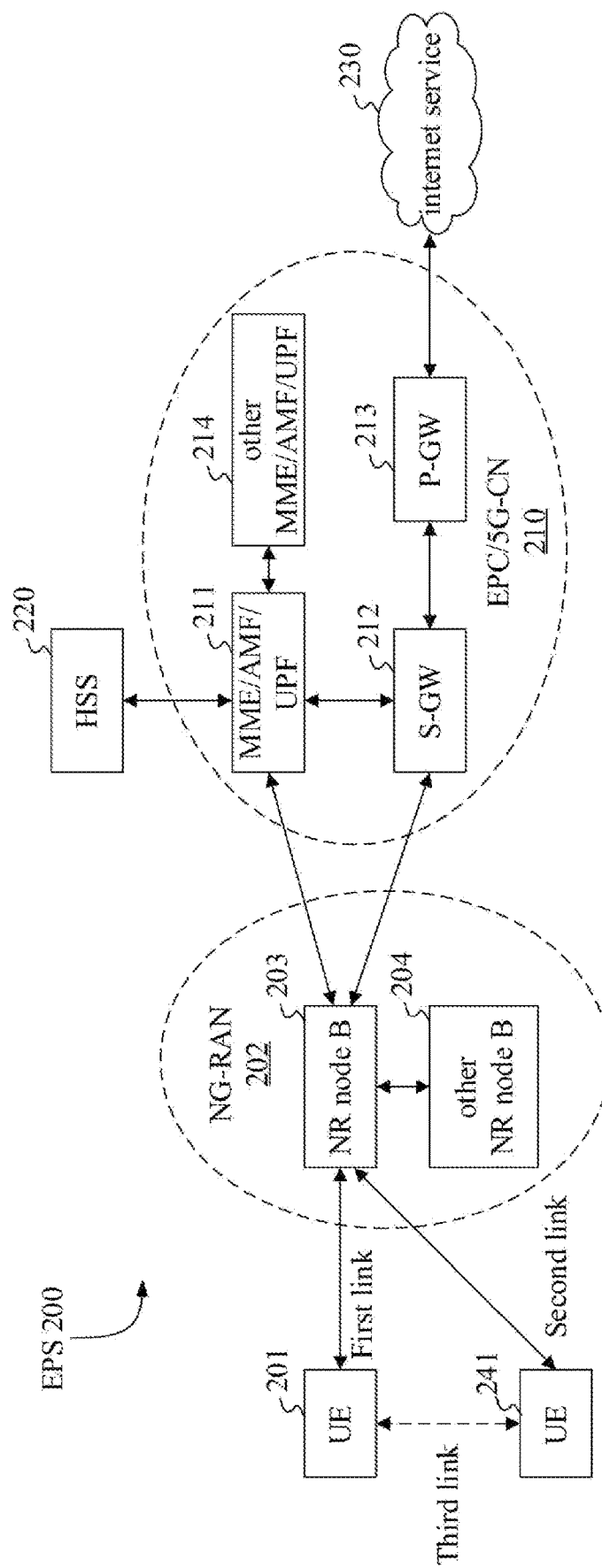
FIG. 13 shows a schematic diagram of a network architecture according to one embodiment of the present disclosure.

Embodiment 13 illustrates a schematic diagram of network architecture, as shown in FIG. 13.

FIG. 13 describes a system network structure 200 of NR 5G, long-term evolution (LTE) and long-term evolution advanced (LTE-A). The network architecture 200 of NR 5G or LTE may be referred to as an evolve packet system (EPS) 200 or some other suitable terminology. The EPS 200 may include one or more UEs 201, NG-radio access network (RAN) 202, 5G-core network (CN)/evolved packet core (EPC) 210, Home Subscriber Server (HSS)220 and the internet service 230. EPS may be interconnected with other access networks, but for the sake of simplicity, these entities/interfaces are not shown. As shown in figure, the EPS provides the packet switching services. Those skilled in the art would readily appreciate that the various concepts presented throughout this disclosure can be extended to networks or other cellular networks that provide circuit switched services. The NG-RAN includes an NR Node B (gNB) 203 and other gNBs 204. The gNB 203 provides user and control plane protocol termination for the UE 201. The gNB 203 can be connected to other gNBs 204 via an Xn interface (eg, a backhaul). The gNB 203 may also be referred to as a base station, a base transceiver station, a wireless base station, a wireless transceiver, a transceiver function, a basic service set (BSS), an extended service set (ESS), a transmission and reception point (TRP), or some other suitable terminology. The gNB 203 provides the UE201 with an access point to the 5G-CN/EPC 210. In the embodiment, the UE201 includes cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 203 is connected to the 5G-CN/EPC 210 through an S1/NG interface. 5G-CN/EPC 210 includes MME/AMF/UPF 211, other Mobility Management Entity (MME)/Authentication Management Field (AMF)/User Plane Function (UPF) 214 An Service Gateway (S-GW) 212 and a Packet Date Network Gateway (P-GW) 213. The MME/AMF/UPF 211 is a control node that handles signaling between the UE 201 and the 5G-CN/EPC 210. In general, MME/AMF/UPF 211 provides bearer and connection management. All User Internet Protocol (IP) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol service, and may specifically include the Internet, an intranet, an IP Multimedia Subsystem (IMS), and a PS streaming service (PSS).

In one embodiment, the UE 201 corresponds to the UE in this disclosure.

In one embodiment, the gNB203 corresponds to the base station in this disclosure.

In one embodiment, the UE 201 supports multi-antenna transmission.

In one embodiment, the gNB 203 supports multi-antenna transmission.

Embodiment 14

Figure 14:
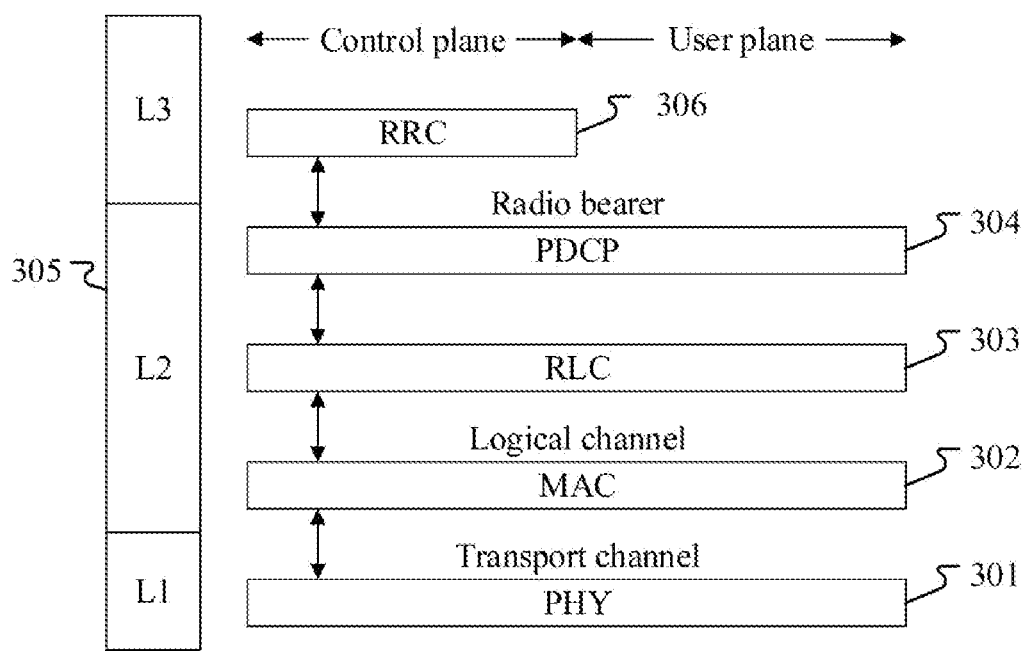
FIG. 14 shows a schematic diagram of a wireless protocol architecture of a user plane and a control plane according to one embodiment of the present disclosure.

Embodiment 14 illustrates a schematic diagram of a radio protocol architecture of a user plane and a control plane, as shown in FIG. 14.

FIG. 14 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture of FIG. 14 is applicable to the user equipment in this disclosure.

In one embodiment, the radio protocol architecture of FIG. 14 is applicable to the base station in this disclosure.

In one embodiment, the first radio signal in the present disclosure is generated by the PHY 301.

In one embodiment, the first control signal in the present disclosure is generated by the PHY 301.

In one embodiment, the second radio signal in the present disclosure is generated by the PHY 301.

In one embodiment, the first reference signal in the present disclosure is generated by the PHY 301.

In one embodiment, the second reference signal in the present disclosure is generated by the PHY 301.

In one embodiment, the first signaling in the present disclosure is generated by the PHY 301.

Embodiment 15

Figure 15:
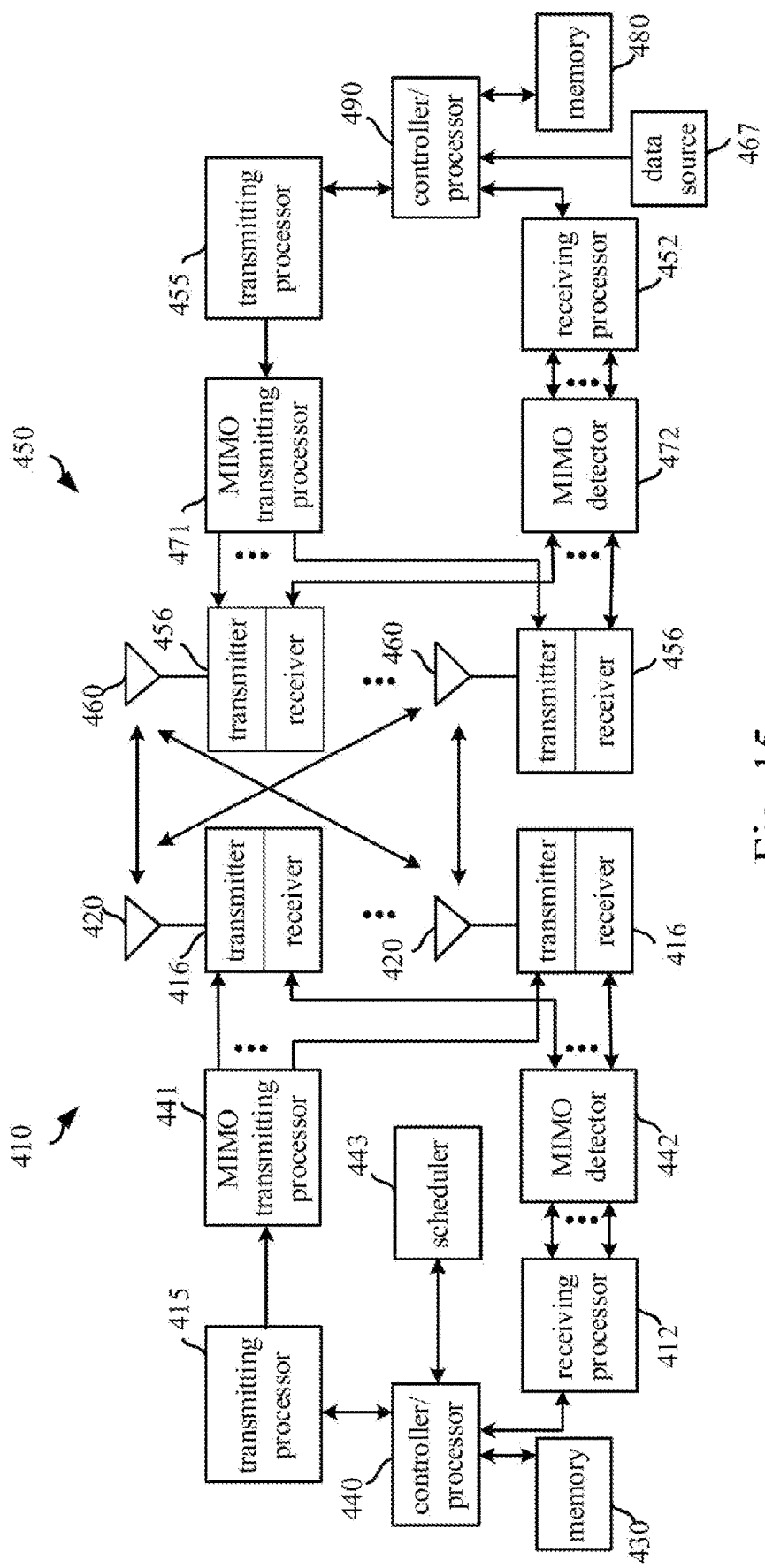
FIG. 15 shows a schematic diagram of a base station device and a given user equipment according to one embodiment of the present disclosure.

Embodiment 15 illustrates a base station device and a given UE, as shown in FIG. 15. The FIG. 15 is a block diagram of a gNB 410 in communication with a UE 450 in an access network.

A base station device (410) comprises a controller/processor 440, a scheduler 443, a memory 430, a receiving processor 412, a transmitting processor 415, a MIMO transmitting processor 441, a MIMO detector 442, and a transmitter/receiver 416, and an antenna 420.

A user equipment (UE 450) comprises a controller/processor 490, a memory 480, a data source 467, a transmitting processor 455, a receiving processor 452, a MIMO transmitting processor 471, a MIMO detector 472, a transmitter/receiver 456, and an antenna 460.

In the downlink transmission (DL), the processing related to the base station (410) comprises:

A higher layer packet is provided to the controller/processor 440, the controller/processor 440 provides header compression, encryption, packet segmentation and reordering, and multiplexing and demultiplexing between logical and transport channels so as to implement L2 layer protocols used for the user plane and the control plane, the higher layer packet may include data or control information, such as a downlink shared channel (DL-SCH);

the controller/processor 440 may be connected with a memory 430 that stores program codes and data, the memory 430 may be a computer-readable medium;

the controller/processor 440, which notifies the scheduler 443 of transmission requests, the scheduler 443 is configured for scheduling the air interface resource(s) corresponding to the transmission requests, and notifying the controller/processor 440 of the scheduling result;

the controller/processor 440 transmits to the transmitting processor 415 control information for uplink transmission acquired from operation on uplink reception by the receiving processor 412;

the transmitting processor 415, which receives the output bit stream from the controller/processor 440, and implements various signal transmission processing functions for the L1 layer (i.e. physical layer), including encoding, interleaving, scrambling, modulation, power control/allocation and physical layer control signaling (i.e., PBCH, PDCCH, PHICH,PCFICH, a reference signal) generation, etc.;

the MIMO transmitting processor 441, which performs spatial processing on data symbols, control symbols or reference signal symbols (such as multi-antenna pre-coding, digital beamforming) and outputs a baseband signal to the transmitter 416;

the MIMO transmitting processor 441, which outputs an analog transmitting beamforming vector to the transmitter 416;

the transmitter 416, which is configured for converting a baseband signals provided by the MIMO transmitting processor 441 into a radio frequency signal to be transmitted via the antenna 420; each transmitter 416 performs sampling processing on respective input symbol streams (e.g. digital to analog conversion, amplification, filtering, upconversion, etc.) to get respective sampled signal streams; each transmitter 416 further processes respective sampled stream to obtain a downlink signal; the analog transmitting beamforming is processed in the transmitter 416.

In the DL transmission, the processing related to the user equipment (450) comprises:

the receiver 456 is configured for converting the radio frequency signal received through the antenna 460 into a baseband signal and providing it to the MIMO detector 472; the analog receiving beamforming is processed in the receiver 456;

the MIMO detector 472 is configured to perform MIMO detection on a signal received from the receiver 456, and provide the baseband signal subjected to the MIMO detection to the receiving processor 452;

the receiving processor 452 extracts parameter relevant to the analog receiving beamforming to be output to the MIMO detector 472, and the MIMO detector 472 outputs the analog receive beamforming vector to the receiver 456;

the receiving processor 452, which implements various signal receiving processing functions for the L1 layer (i.e. physical layer) , including decoding, deinterleaving, descrambling, demodulation and physical layer control signaling extraction, etc.;

the controller/processor 490 receives the bit stream output by the receive processor 452, provides header decompression, decryption, packet segmentation and reordering, and multiplexing and demultiplexing between a logical channel and a transport channel to implement L2 layer protocol for user plane and control plane;

the controller/processor 490 is associated with a memory 480 that stores program codes and data, and the memory 480 may be a computer-readable medium;

the controller/processor 490 transmits to the receiving processor 452 the control information for downlink reception obtained from uplink transmission processing by the transmitting processor 455.

The first control signal in the present disclosure is generated by the transmitting processor 415. The MIMO transmitting processor 441 performs multi-antenna precoding on a baseband signal associated with the first control signal output by the transmitting processor 415. The transmitter 416 converts a baseband signal provided by the MIMO transmitting processor 441 into a radio frequency signal, performs analog transmit beamforming, and transmits the radio frequency signal via antenna 420. The receiver 456 then receives the radio frequency signal through the antenna 460, perform analog receive beamforming, obtain a radio frequency signal related to the first control signal, and convert the radio frequency signal into a baseband signal to be supplied to the MIMO detector 472. The MIMO detector 472 performs MIMO detection on the signal received from the receiver 456. The receiving processor 452 processes the baseband signal output by the MIMO detector 472 to obtain the first control signal.

The first radio signal in the present disclosure is generated by the transmitting processor 415. The MIMO transmitting processor 441 performs multi-antenna precoding on a baseband signal associated with the first radio signal output by the transmitting processor 415. The transmitter 416 converts the baseband signal provided by MIMO transmit processor 441 into a radio frequency signal, performs analog transmitting beamforming, and transmits the radio frequency signal via antenna 420. The receiver 456 will receive the radio frequency signal through the antenna 460, perform analog receive beamforming, obtain a radio frequency signal related to the first radio signal, and convert the radio frequency signal into a baseband signal to be supplied to the MIMO detector 472. The MIMO detector 472 performs MIMO detection on the signal received from the receiver 456. The receiving processor 452 performs channel detection on the baseband signal output from the MIMO detector 472.

The first signaling in the present disclosure is generated by the transmitting processor 415 and output to the controller/processor 440 or is directly generated by the transmitting processor 415. The MIMO transmitting processor 441 performs multi-antenna precoding on a baseband signal relevant to the first signaling output by the transmitting processor 415. The transmitter 416 converts the baseband signal provided by MIMO transmitting processor 441 into a radio frequency signal, performs analog transmit beamforming, and transmits the radio frequency signal via antenna 420. The receiver 456 will receive the radio frequency signal through the antenna 460, perform analog receive beamforming, obtain a radio frequency signal related to the first signaling, and convert the radio frequency signal into a baseband signal to be provided to the MIMO detector 472. The MIMO detector 472 performs MIMO detection on the signal received from the receiver 456. The receiving processor 452 processes the baseband signal output by the MIMO detector 472 to obtain the first signaling.

The second signaling in this disclosure is generated by the transmitting processor 415. The MIMO transmitting processor 441 performs multi-antenna precoding on a baseband signal relevant to the first signaling output by the transmission processor 415. The transmitter 416 converts the baseband signal provided by MIMO transmitting processor 441 into a radio frequency signal, performs analog transmit beamforming, and transmits the radio frequency signal via antenna 420. The receiver 456 will receive the radio frequency signal through the antenna 460, perform analog receive beamforming, obtain a radio frequency signal related to the first signaling, and convert the radio frequency signal into a baseband signal to be supplied to the MIMO detector 472. The MIMO detector 472 performs MIMO detection on the signal received from the receiver 456. The receiving processor 452 processes the baseband signal outputted by the MIMO detector 472 to obtain the first signaling.

The first information in the present disclosure is generated by the controller/processor 440 and output to the transmit processor 415 or is directly generated by the transmit processor 415. The MIMO transmitting processor 441 performs multi-antenna precoding on a baseband signal relevant to the first signaling output by the transmitting processor 415. The transmitter 416 converts the baseband signal provided by MIMO transmitting processor 441 into a radio frequency signal, performs analog transmit beamforming, and transmits the radio frequency signal via antenna 420. The receiver 456 will receive the radio frequency signal through the antenna 460, perform analog receive beamforming, obtain a radio frequency signal related to the first signaling, and convert the radio frequency signal into a baseband signal to be provided to the MIMO detector 472. The MIMO detector 472 performs MIMO detection on the signal received from the receiver 456. The receiving processor 452 processes the baseband signal outputted by the MIMO detector 472 to obtain the first information.

In uplink (UL) transmission, the processing related to the user equipment (UE450) comprises:

the data source 467 provides a higher layer packet to controller/processor 490. The controller/processor 490 implements header compression, encryption, packet segmentation and reordering, and multiplexing and demultiplexing between the logical and transport channels, and implements an L2 layer protocol for the user plane and the control plane; the higher layer packet includes data or control information, such as an Uplink Shared Channel (UL-SCH);

the controller/processor 490 can be associated with the memory 480 that stores program codes and data. The memory 480 can be a computer readable medium;

the controller/processor 490 transmits to the transmitting processor 455 the control information for uplink transmission obtained from processing on downlink reception by the receiving processor 452;

the transmitting processor 455 receives the output bit stream of controller/processor 490 and implements various signal reception processing functions for the L1 layer (i.e. physical layer), including encoding, interleaving, scrambling, modulation, power control/allocation and physical layer signaling (i.e., PUCCH, Sounding Reference Signal generation (SRS), a detection reference signal) , etc.;

the MIMO transmitting processor 471 performs spatial processing on data symbols, control symbols or reference signal symbols (such as multi-antenna pre-coding, digital beamforming) and outputs a baseband signal to the transmitter 456;

the MIMO transmitting processor 471 outputs an analog transmitting beamforming vector to the transmitter 457;

The transmitter 456 is configured to convert a baseband signals provided by MIMO transmitting processor 471 into a radio frequency signal and transmit the radio frequency signal via the antenna 460; each transmitter 456 samples respective input symbol stream to obtain respective sampled signal stream. Each transmitter 456 further processes the respective sampled streams (such as digital-to-analog conversion, amplification, filtering, up-conversion, etc.) to obtain an uplink signal. The analog transmitting beamforming is processed in the transmitter 456.

In the uplink (UL) transmission, the processing related to the base station device (410) comprises:

the receiver 416 is configured to convert the radio frequency signal received by the antenna 420 into a baseband signal and provide the baseband signal to the MIMO detector 442; the analog receiving beamforming is processed in the receiver 416;

the MIMO detector 442 is configured to perform MIMO detection on the signal received from the receiver 416, and provide the receiving processor 442 with the MIMO-detected symbol;

the MIMO detector 442 outputs an analog receiving beamforming vector to the receiver 416;

the receiving processor 412 implements various signal receiving processing functions for the L1 layer (i.e. the physical layer), including decoding, deinterleaving, descrambling, demodulation, and physical layer control signaling extraction, and the like;

the controller/processor 440 receives the bit stream outputted by the receiving processor 412, and provides header decompression, decryption, packet segmentation, reordering, and multiplexing and demultiplexing between the logical and transport channels so as to implement L2 layer protocol of user plane and control plane;

the controller/processor 440 can be associated with memory 430 that stores program codes and data. The memory 430 can be a computer readable medium;

the controller/processor 440 transmits the control information of the uplink transmission obtained from processing the downlink transmission by the transmission processor 415 to the receiving processor 412;

The second information in the present disclosure is generated by the transmit processor 455. The MIMO transmitting processor 471 performs multi-antenna precoding on a baseband signal relevant to the second information output by the transmitting processor 455. The transmitter 456 converts the baseband signal provided by the MIMO transmitting processor 471 into a radio frequency signal, performs analog transmitting beamforming, and transmits the radio frequency signal via antenna 460. The receiver 416 will receive the radio frequency signal through the antenna 420, perform analog receive beamforming, obtain a radio frequency signal related to the second information, and convert the radio frequency signal into a baseband signal for supply to the MIMO detector 442. The MIMO detector 442 performs MIMO detection on the signal received from the receiver 416. The receiving processor 412 processes the baseband signal outputted by the MIMO detector 442 to obtain the second information.

In one embodiment, the UE 450 comprises: at least one processor and at least one memory, the at least one memory further comprising computer program codes; the at least one memory and the computer program code are configured to work in collaboration with the processor, the UE 450 at least: receives a first radio signal and a first signaling. The first radio signal is transmitted by K antenna port groups; the antenna port group(s) includes a positive integer number of the antenna port(s); the first antenna port group is one of the K antenna port groups; the first signaling is used to determine a first time resource pool; at least one first antenna virtualization vector, and second antenna virtualization vector is associated with the first antenna port group; the first antenna virtualization vector is an antenna virtualization vector available to a transmitter of the first signaling in the first time resource pool; the second antenna virtualization vector is an antenna virtualization vector available to the user equipment in the first time resource pool; the K is a positive integer greater than 1.

In one embodiment, the UE 450 comprises a memory storing a computer readable instruction program, which generates an action when executed by at least one processor, and the action comprises: receiving first radio signal and a first signaling. The first radio signal is transmitted by K antenna port groups; the antenna port group(s) includes a positive integer number of the antenna port(s); the first antenna port group is one of the K antenna port groups; the first signaling is used to determine a first time resource pool; at least one of first antenna virtualization vector, and second antenna virtualization vector is associated with the first antenna port group; the first antenna virtualization vector is an antenna virtualization vector available to a transmitter of the first signaling in the first time resource pool; the second antenna virtualization vector is an antenna virtualization vector available to the user equipment in the first time resource pool; the K is a positive integer greater than 1.

In one embodiment, the gNB 410 device comprises: at least one processor and at least one memory, the at least one memory comprises computer program codes; the at least one memory and the computer program code are configured to work in collaboration with at least one processor. The gNB410 at least: transmits a first radio signal; and transmits a first signaling. The first radio signal is transmitted by K antenna port groups, the antenna port group(s) includes a positive integer number of the antenna port(s); and the first antenna port group is one of the K antenna port groups; the first signaling is used to determine a first time resource pool; at least one first antenna virtualization vector, and second antenna virtualization vector is associated with the first antenna port group; the first antenna virtualization vector is an antenna virtualization vector available to a transmitter of the first signaling in the first time resource pool; the second antenna virtualization vector is an antenna virtualization vector available to a target receiver of the first signaling in the first time resource pool; the K is a positive integer greater than 1.

In one embodiment, the gNB 410 comprises: a memory storing a computer readable instruction program, which generates an action when executed by at least one processor, and the action comprises: transmitting first radio signal, transmitting the first signaling. The first radio signal is transmitted by K antenna port groups, the antenna port group(s) includes a positive integer number of the antenna port(s); and the first antenna port group is one of the K antenna port groups; the first signaling is used to determine a first time resource pool; at least one first antenna virtualization vector, and second antenna virtualization vector is associated with the first antenna port group; the first antenna virtualization vector is an antenna virtualization vector available to a transmitter of the first signaling in the first time resource pool; the second antenna virtualization vector is an antenna virtualization vector available to the user equipment in the first time resource pool; the K is a positive integer greater than 1.

In one embodiment, the UE 450 corresponds to the UE in the present disclosure.

In one embodiment, the gNB 410 corresponds to the base station in the present disclosure.

In one embodiment, the transmitting processor 415, the MIMO transmitter 441 and the transmitter/receiver 416 are used to transmit the first radio signal in the present disclosure.

In one embodiment, the receiver 456, the MIMO detector 472, and the receiving processor 452 are configured to receive the first radio signal in the present disclosure.

In one embodiment, the transmitting processor 415, the MIMO transmitter 441 and the transmitter/receiver 416 are used to transmit the first signaling in the present disclosure.

In one embodiment, the controller/processor 440 is configured to transmit the first signaling in the present disclosure.

In one embodiment, the transmitter/receiver 456, the MIMO detector 472, and the receiving processor 452 are configured to receive the first signaling in the present disclosure.

In one embodiment, the controller/processor 490 is configured to receive the first signaling in the present disclosure.

In one embodiment, the transmitting processor 415, the MIMO transmitter 441 and the transmitter/receiver 416 are used to transmit the second signaling in the present disclosure.

In one embodiment, the transmitter/receiver 456, the MIMO detector 472, and the receiving processor 452 are configured to receive the second signaling in the present disclosure.

In one embodiment, the transmitting processor 415, the MIMO transmitter 441 and the transmitter/receiver 416 are used to transmit the first information in the present disclosure.

In one embodiment, the controller/processor 440 is configured to transmit the first information in the present disclosure.

In one embodiment, the transmitter/receiver 456, the MIMO detector 472, and the receiving processor 452 are used to receive the first information in the present disclosure.

In one embodiment, the controller/processor 490 is configured to receive the first information in the present disclosure.

In one embodiment, the transmitting processor 455, the MIMO transmitter 471, and the transmitter 456 are used to transmit the second information in the present disclosure.

In one embodiment, the receiver 416, the MIMO detector 442, and the receiving processor 412 are configured to receive the second information in the present disclosure.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method for multi-antenna transmission in a user equipment, comprising:
receiving a first radio signal; and
receiving a first signaling;
wherein the first radio signal is transmitted by K antenna port groups; the antenna port group includes a positive integer number of antenna port(s); a first antenna port group is one of the K antenna port groups; the first signaling is used to determine a first time resource pool; a second antenna virtualization vector is associated with the first antenna port group; the second antenna virtualization vector is an antenna virtualization vector available to the user equipment in the first time resource pool; and the K is a positive integer greater than 1; the first radio signal includes one or more of PSS (Primary Synchronization Signal), SSS (Secondary Synchronization Signal), MIB (Master Information Block)/SIB (System Information Block) or CSI-RS (Channel State Information Reference signal); the first signaling is a downlink signaling.

2. The method of claim 1, further comprising:
receiving a second signaling; and
operating a second radio signal in a first time resource sub-pool;
wherein the operating is one of receiving or transmitting the second radio signal; the second signaling is used to determine the first time resource sub-pool from the first time resource pool; and the second signaling is used to determine at least one of occupied frequency domain resources, an MCS, a HARQ process number, an RV, an NDI and (a) transmitting antenna port(s) of the second radio signal.

3. The method of claim 1, wherein the first signaling indicates the first antenna port group from the K antenna port group(s);
or, comprising:
receiving first information, wherein the first information is used to determine the first antenna port group.

4. The method of claim 1, further comprising:
transmitting second information, wherein the second information is used to determine K1 antenna port group(s); the K1 antenna port group(s) belong(s) to the K antenna port groups; the first antenna port group is one of the K1 antenna port group(s); the K1 is a positive integer;
or, transmitting second information, wherein the second information is used to determine K1 antenna port group(s); the K1 antenna port group(s) belong(s) to the K antenna port groups; the first antenna port group is one of the K1 antenna port group(s); the K1 is a positive integer; the second information includes a CRI(CRIs) (CSI-RS Resource Indicator), and the CRI(s) indicates(indicate) the CSI-RS resource(s) corresponding to the K1 antenna port group(s) from the CSI-RS resources corresponding to the K antenna port groups;
or, transmitting second information, wherein the second information is used to determine K1 antenna port group(s); the K1 antenna port group(s) belong(s) to the K antenna port groups; the first antenna port group is one of the K1 antenna port group(s); the K1 is a positive integer; the second information is a RACH preamble, and at least one of the sequence of the RACH preamble or the time-frequency resource occupied by the RACH preamble is used to determine the first antenna port group.

5. The method of claim 1, wherein the first time resource pool is discontinuous in time domain; or the first signaling is a semi-static signaling; or the first signaling is a high layer signaling; or the first signaling is a physical layer signaling; or the first signaling includes one or more RRC IEs; or the first signaling is carried by a PDCCH; or the first signaling is transmitted on a PBCH; or the first signaling is cell-common; or the first signaling is for the UE.

6. A method for multi-antenna transmitting in a base station, comprising:
transmitting a first radio signal; and
transmitting a first signaling;
wherein the first radio signal is transmitted by K antenna port groups; the antenna port group includes a positive integer number of antenna port(s); a first antenna port group is one of the K antenna port groups; the first signaling is used to determine a first time resource pool; a second antenna virtualization vector is associated with the first antenna port group; the second antenna virtualization vector is an antenna virtualization vector available to a target receiver of the first signaling in the first time resource pool; and the K is a positive integer greater than 1; the first radio signal includes one or more of PSS (Primary Synchronization Signal), SSS (Secondary Synchronization Signal), MIB (Master Information Block)/SIB (System Information Block) or CSI-RS (Channel State Information Reference signal); the first signaling is a downlink signaling.

7. The method of claim 6, further comprising:
transmitting a second signaling; and
performing a second radio signal in a first time resource sub-pool;
wherein the performing is one of transmitting or receiving the second radio signal; the second signaling is used to determine the first time resource sub-pool from the first time resource pool; the second signaling is used to determine at least one of occupied frequency domain resources, an MCS, a HARQ process number, an RV, an NDI and (a) transmitting antenna port(s) of the second radio signal.

8. The method of claim 6, wherein the first signaling indicates the first antenna port group from the K antenna port group(s);
or, comprising:
transmitting first information, wherein the first information is used to determine the first antenna port group.

9. The method of claim 6, further comprising:
receiving second information, wherein the second information is used to determine K1 antenna port group(s); the K1 antenna port group(s) belong(s) to the K antenna port groups; the first antenna port group is one of the K1 antenna port group(s); the K1 is a positive integer;
or, receiving second information, wherein the second information is used to determine K1 antenna port group(s); the K1 antenna port group(s) belong(s) to the K antenna port groups; the first antenna port group is one of the K1 antenna port group(s); the K1 is a positive integer; the second information includes a CRI(CRIs) (CSI-RS Resource Indicator), and the CRI(s) indicates(indicate) the CSI-RS resource(s) corresponding to the K1 antenna port group(s) from the CSI-RS resources corresponding to the K antenna port groups;

or, receiving second information, wherein the second information is used to determine K1 antenna port group(s); the K1 antenna port group(s) belong(s) to the K antenna port groups; the first antenna port group is one of the K1 antenna port group(s); the K1 is a positive integer; the second information is a RACH preamble, and at least one of the sequence of the RACH preamble or the time-frequency resource occupied by the RACH preamble is used to determine the first antenna port group.

10. The method of claim 6, wherein the first time resource pool is discontinuous in time domain; or the first signaling is a semi-static signaling; or the first signaling is a high layer signaling; or the first signaling is a physical layer signaling; or the first signaling includes one or more RRC IEs; or the first signaling is carried by a PDCCH; or the first signaling is transmitted on a PBCH; or the first signaling is cell-common; or the first signaling is for the UE.

11. A user equipment (UE) for multi-antenna transmission, comprising:
a first transceiver, receiving a first radio signal; and
a second receiver, receiving a first signaling;
wherein the first radio signal is transmitted by K antenna port groups; the antenna port group includes a positive integer number of antenna port(s); a first antenna port group is one of the K antenna port groups; the first signaling is used to determine a first time resource pool; a second antenna virtualization vector is associated with the first antenna port group; the second antenna virtualization vector is an antenna virtualization vector available to the user equipment in the first time resource pool; and the K is a positive integer greater than 1; the first radio signal includes one or more of PSS (Primary Synchronization Signal), SSS (Secondary Synchronization Signal), MIB (Master Information Block)/SIB (System Information Block) or CSI-RS (Channel State Information Reference signal); the first signaling is a downlink signaling.

12. The UE of claim 11, comprising:
a third receiver, receiving a second signaling; and
a second transceiver, operating a second radio signal in a first time resource sub-pool;
wherein the operating is one of receiving or transmitting the second radio signal; the second signaling is used to determine the first time resource sub-pool from the first time resource pool; and the second signaling is used to determine at least one of occupied frequency domain resources, a MCS, a HARQ process number, a RV, a NDI and (a) transmitting antenna port(s) of the second radio signal.

13. The UE of claim 11, wherein the first signaling indicates the first antenna port group from the K antenna port group(s);
or, the second receiver further receives first information, wherein the first information is used to determine the first antenna port group.

14. The UE of claim 11, wherein:
the first transceiver further transmits second information, wherein the second information is used to determine K1 antenna port group(s); the K1 antenna port group(s) belong(s) to the K antenna port groups; the first antenna port group is one of the K1 antenna port group(s); the K1 is a positive integer;

or, the first transceiver further transmits second information, wherein the second information is used to determine K1 antenna port group(s); the K1 antenna port group(s) belong(s) to the K antenna port groups; the first antenna port group is one of the K1 antenna port group(s); the K1 is a positive integer; the second information includes a CRI(CRIs) (CSI-RS Resource Indicator), and the CRI(s) indicates(indicate) the CSI-RS resource(s) corresponding to the K1 antenna port group(s) from the CSI-RS resources corresponding to the K antenna port groups;

or, the first transceiver further transmits second information, wherein the second information is used to determine K1 antenna port group(s); the K1 antenna port group(s) belong(s) to the K antenna port groups; the first antenna port group is one of the K1 antenna port group(s); the K1 is a positive integer; the second information is a RACH preamble, and at least one of the sequence of the RACH preamble or the time-frequency resource occupied by the RACH preamble is used to determine the first antenna port group.

15. The UE of claim 11, wherein the first time resource pool is discontinuous in time domain; or the first signaling is a semi-static signaling; or the first signaling is a high layer signaling; or the first signaling is a physical layer signaling; or the first signaling includes one or more RRC IEs; or the first signaling is carried by a PDCCH; or the first signaling is transmitted on a PBCH; or the first signaling is cell-common; or the first signaling is for the UE.

16. A base station equipment for multi-antenna transmission, comprising:
a third transceiver, transmitting a first radio signal; and
a second transmitter, transmitting a first signaling;
wherein the first radio signal is transmitted by K antenna port groups; the antenna port group includes a positive integer number of antenna port(s); a first antenna port group is one of the K antenna port groups; the first signaling is used to determine a first time resource pool; a second antenna virtualization vector is associated with the first antenna port group; the second antenna virtualization vector is an antenna virtualization vector available to a target receiver of the first signaling in the first time resource pool; and the K is a positive integer greater than 1; the first radio signal includes one or more of PSS (Primary Synchronization Signal), SSS (Secondary Synchronization Signal), MIB (Master Information Block)/SIB (System Information Block) or CSI-RS (Channel State Information Reference signal); the first signaling is a downlink signaling.

17. The base station equipment of claim 16, further comprising:
a third transmitter, transmitting a second signaling; and
a fourth transceiver, performing a second radio signal in a first time resource sub-pool;
wherein the performing is one of transmitting or receiving the second radio signal; the second signaling is used to determine the first time resource sub-pool from the first time resource pool; the second signaling is used to determine at least one of occupied frequency domain resources, a MCS, a HARQ process number, a RV, a NDI and (a) transmitting antenna port(s) of the second radio signal.

18. The base station equipment of claim 16, wherein the first signaling indicates the first antenna port group from the K antenna port group(s);

or, the second transmitter further transmits first information, wherein the first information is used to determine the first antenna port group.

19. The base station equipment of claim 16, wherein:

the third transceiver further receives second information, wherein the second information is used to determine K1 antenna port group(s); the K1 antenna port group(s) belong(s) to the K antenna port groups; the first antenna port group is one of the K1 antenna port group(s); the K1 is a positive integer;

or, the third transceiver further receives second information, wherein the second information is used to determine K1 antenna port group(s); the K1 antenna port group(s) belong(s) to the K antenna port groups; the first antenna port group is one of the K1 antenna port group(s); the K1 is a positive integer; the second information includes a CRI(CRIs) (CSI-RS Resource Indicator), and the CRI(s) indicates(indicate) the CSI-RS resource(s) corresponding to the K1 antenna port group(s) from the CSI-RS resources corresponding to the K antenna port groups;

or, the third transceiver further receives second information, wherein the second information is used to determine K1 antenna port group(s); the K1 antenna port group(s) belong(s) to the K antenna port groups; the first antenna port group is one of the K1 antenna port group(s); the K1 is a positive integer; the second information is a RACH preamble, and at least one of the sequence of the RACH preamble or the time-frequency resource occupied by the RACH preamble is used to determine the first antenna port group.

20. The base station equipment of claim 16, wherein the first time resource pool is discontinuous in time domain; or the first signaling is a semi-static signaling; or the first signaling is a high layer signaling; or the first signaling is a physical layer signaling; or the first signaling includes one or more RRC IEs; or the first signaling is carried by a PDCCH; or the first signaling is transmitted on a PBCH; or the first signaling is cell-common; or the first signaling is for the UE.

* * * * *